(12) United States Patent
Amitay

(10) Patent No.: US 10,311,326 B2
(45) Date of Patent: Jun. 4, 2019

(54) SYSTEMS AND METHODS FOR IMPROVED IMAGE TEXTURES

(71) Applicant: QUALCOMM Incorporated, San Diego, CA (US)

(72) Inventor: Amichay Amitay, Hod Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 29 days.

(21) Appl. No.: 15/476,205

(22) Filed: Mar. 31, 2017

(65) Prior Publication Data

US 2018/0285679 A1 Oct. 4, 2018

(51) Int. Cl.
| | |
|---|---|
| *G06T 11/00* | (2006.01) |
| *G06T 5/50* | (2006.01) |
| *G06K 9/62* | (2006.01) |
| *G06K 9/46* | (2006.01) |
| *G06T 7/11* | (2017.01) |
| *G06T 5/00* | (2006.01) |

(52) U.S. Cl.
CPC .......... *G06K 9/4642* (2013.01); *G06K 9/627* (2013.01); *G06K 9/6215* (2013.01); *G06K 9/6256* (2013.01); *G06T 5/001* (2013.01); *G06T 5/007* (2013.01); *G06T 5/50* (2013.01); *G06T 7/11* (2017.01); *G06T 11/001* (2013.01); *G06T 2207/20081* (2013.01); *G06T 2207/20084* (2013.01)

(58) Field of Classification Search
CPC .. G06K 9/4642; G06K 9/6256; G06K 9/6215; G06K 9/627; G06T 11/001; G06T 5/007; G06T 5/50; G06T 5/001; G06T 7/11; G06T 2207/20084; G06T 2207/20081

See application file for complete search history.

(56) References Cited

U.S. PATENT DOCUMENTS

| 9,576,351 B1* | 2/2017 | Barzel ................. G06T 11/001 |
| 2003/0076334 A1* | 4/2003 | Dumitras ................ G06T 7/40 |
| | | 345/582 |
| 2008/0001963 A1 | 1/2008 | Lefebvre et al. |
| 2009/0184973 A1* | 7/2009 | Perani ................. G06T 11/001 |
| | | 345/582 |

(Continued)

OTHER PUBLICATIONS

Gatys et al. "Image Style Transfer Using Convolutional Neural Networks." IEEE Conference on Computer Vision and Pattern Recognition, Jun. 27, 2016 pp. 2414-2423.*

(Continued)

*Primary Examiner* — Jon Chang
(74) *Attorney, Agent, or Firm* — Paradice & Li LLP

(57) ABSTRACT

Methods and systems for image texture enhancement are disclosed. In some aspects, texture information for a plurality of object types is stored in a database. Objects are recognized in an image, and the type of each recognized object is identified. The database is consulted to determine textures for each of the recognized objects, based on the type of each object. A portion of a new image representing the recognized object is then updated based on its determined texture. Multiple objects having multiple different textures may be updated in this manner within a single image. This may result in improved image textures over known methods, especially when low light exposures may result in reduced image resolution and degraded textures.

19 Claims, 17 Drawing Sheets

(56) References Cited

U.S. PATENT DOCUMENTS

| | | |
|---|---|---|
| 2016/0104309 A1 | 4/2016 | Kim et al. |
| 2016/0196479 A1 | 7/2016 | Chertok et al. |
| 2018/0068463 A1* | 3/2018 | Risser .................. G06T 7/45 |
| 2018/0082407 A1* | 3/2018 | Rymkowski ........... G06T 5/005 |
| 2018/0322662 A1* | 11/2018 | Hellier ................. G06T 11/001 |

OTHER PUBLICATIONS

Karpathy Andrej, Blog: "What a Deep Neural Network Thinks About Your #Selfie", Hacker's Guide to Neural Networks, Oct. 25, 2015, Retrieved from Internet on Sep. 7, 2016, http://karpathy.github.io/2015/10/25/selfie/ pp. 1-24.

Lore K.G., et al., "LLNet: A Deep Autoencoder Approach to Natural Low-Light Image Enhancement", Preprint submitted to Special Issue on Deep Image and Video Understanding, Jun. 13, 2016, pp. 1-29.

Gatys L.A., et al., A Neural Algorithm of Artistic Style, Sep. 2, 2015, Retrieved from Internet arXiv:1508.0657v2 [cs.CV]; pp. 1-16.

International Search Report and Written Opinion—PCT/US2018/016402—ISA/EPO—dated Apr. 20, 2018.

Roman Novak et al: "Improving the Neural Algorithm of Artistic Style," arxiv.org, Cornell University Library, 201 Olin Library Cornell University Ithaca, NY 14853, May 15, 2016 (May 15, 2016), XP080701260, pp. 1-15.

Gatys L.A., et al., "Texture Synthesis Using Convolutional Neural Networks," May 27, 2015 (May 27, 2015), XP055430132, Retrieved from the Internet: URL:https://pdfs.semanticscholar.org/f54a/e5229960b828db7cd963150c8b8bc2684737.pdf, pp. 1-10, [retrieved on Apr. 11, 2018].

* cited by examiner

SYSTEMS AND METHODS FOR IMPROVED IMAGE TEXTURES

BACKGROUND

Field

This technology relates to image processing, and more specifically to image processing to enhance textures of objects within the image.

Description of the Related Art

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages that include improved image textures, especially in lower light regions of an image.

One aspect disclosed is a method of generating an image. The method includes receiving, by an electronic hardware processor, image data, identifying, by the electronic hardware processor, a first and second object represented by the image data, identifying, by the electronic hardware processor, a first and second type of the first and second objects respectively, identifying first style information for the first type of object and different second style information for the second type of object from an object database, generating by the electronic hardware processor, second image data representing the first and second objects based on the image data and the first and second style information, and writing by the electronic hardware processor, the second image data to an output device. In some aspects, the method also includes identifying the first and second object via a convolutional neural network. In some aspects, the method also includes utilizing artistic style transfer to transfer different styles to the first and second objects in the second image data based on the first and second style information respectively. In some aspects, utilizing artistic style transfer comprises minimizing a distance between a convolutional neural network's content representation of the image data representing the first object and the CNN's content representation of the second image data representing the first object and minimizing a second distance between style representations of the first object in the second image data and the first style information.

In some aspects, utilizing artistic style transfer further comprises minimizing a third distance between the convolutional neural network's content representation of the image data representing the second object and the CNN's content representation of the second image data representing the second object, and minimizing a fourth distance between style representations of the second object in the second image and the second style information. In some aspects, the content representations are based on feature representations for a plurality of layers in the CNN of an object in the image data and of the object in the second image data. In some aspects, the feature representations are based on outputs of filters of the image data. In some aspects, the style representations are based on correlations between different filter responses of the CNN to the first object in the second image data and correlations between different filter responses stored in the object database for objects of the first type.

Some aspects of the method also include capturing an image using an imaging sensor, wherein the image data is received from the imaging sensor. In some aspects, the method includes identifying low exposure and high exposure portions of the image data; and generating the second image based on the first or second style information for low exposure portions of the image data.

Another aspect disclosed is an apparatus for generating an image. The apparatus includes a camera, comprising an imaging sensor configured to capture one or more images, an electronic hardware processor, configured to receive image data from one of one or more images captured by the imaging sensor, identify a first and second object represented by the image data, identify a first and second type of the first and second objects respectively, identify first style information for the first type of object and different second style information for the second type of object from an object database, generate second image data representing the first and second objects based on the image data and the first and second style information, and write the second image data to an output device.

In some aspects of the apparatus, the electronic hardware processor is further configured to utilize artistic style transfer to transfer different styles to the first and second objects in the second image data based on the first and second style information respectively.

In some aspects of the apparatus, utilizing artistic style transfer comprises minimizing a distance between a convolutional neural network's content representation of the image data representing the first object and the CNN's content representation of the second image data representing the first object and minimizing a second distance between style representations of the first object in the second image data and the first style information. In some aspects, utilizing artistic style transfer further comprises minimizing a third distance between the convolutional neural network's content representation of the image data representing the second object and the CNN's content representation of the second image data representing the second object, and minimizing a fourth distance between style representations of the second object in the second image and the second style information. In some aspects, the content representations are based on feature representations for a plurality of layers in the CNN of an object in the image data and of the object in the second image data. In some aspects, the feature representations are based on outputs of filters of the image data. In some aspects, the style representations are based on correlations between different filter responses of the CNN to the first object in the second image data and correlations between different filter responses stored in the object database for objects of the first type. In some aspects, the electronic hardware processor is further configured to capture an image using the imaging sensor, wherein the image data is received from the imaging sensor.

In some aspects, the electronic hardware processor is further configured to identify low exposure and high exposure portions of the image data, and generate the second image based on the first or second style information for low exposure portions of the image data.

Another aspect disclosed is a non-transitory computer readable medium comprising instructions that when executed cause a processor to perform a method of generating an image. The method includes receiving, by an electronic hardware processor, image data, identifying, by the electronic hardware processor, a first and second object represented by the image data, identifying, by the electronic hardware processor, a first and second type of the first and second objects respectively, identifying first style information for the first type of object and different second style information for the second type of object from an object database, generating by the electronic hardware processor, second image data representing the first and second objects based on the image data and the first and second style information, and writing by the electronic hardware processor, the second image data to an output device.

BRIEF DESCRIPTION OF THE DRAWINGS

The various features illustrated in the drawings may not be drawn to scale. Accordingly, the dimensions of the various features may be arbitrarily expanded or reduced for clarity. Furthermore, dotted or dashed lines and objects may indicate optional features or be used to show organization of components. In addition, some of the drawings may not depict all of the components of a given system, method, or device. Finally, like reference numerals may be used to denote like features throughout the specification and FIGs.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Furthermore, although particular aspects are described herein, many variations and permutations of these aspects fall within the scope of the disclosure. In addition, the scope of the disclosure is not intended to be limited to particular the benefits, uses, or objectives disclosed herein. Rather, aspects of the disclosure are intended to be broadly applicable to different wired and wireless technologies, system configurations, networks, and transmission protocols, some of which are illustrated by way of example in the FIG.s and in the following description of the preferred aspects. The detailed description and drawings are merely illustrative of the disclosure rather than limiting, the scope of the disclosure being defined by the appended claims and equivalents thereof.

An Example Neural System, Training and Operation

Figure 1:
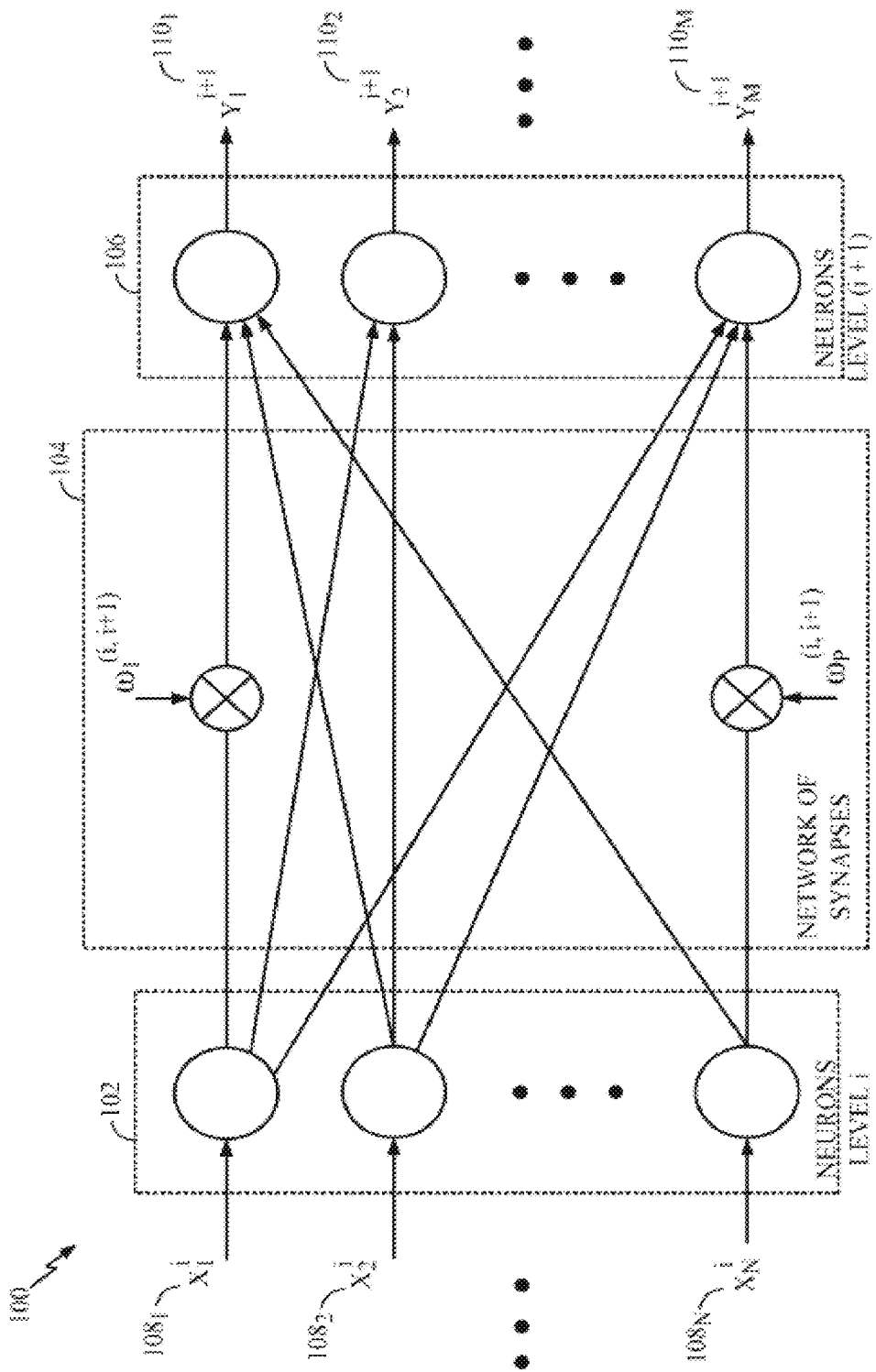
FIG. 1 illustrates an example network of neurons in accordance with certain aspects of the present disclosure.

FIG. 1 illustrates an example artificial neural system 100 with multiple levels of neurons in accordance with certain aspects of the present disclosure. The neural system 100 may have a level of neurons 102 connected to another level of neurons 106 through a network of synaptic connections 104 (e.g., feed-forward connections). For simplicity, only two levels of neurons are illustrated in FIG. 1, although fewer or more levels of neurons may exist in a neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106). In some modeling approaches, the neuron may continuously transfer a signal to the next level of neurons.

This signal is typically a function of the membrane potential. Such behavior can be emulated or simulated in hardware and/or software, including analog and digital implementations such as those described below.

In biological neurons, the output spike generated when a neuron fires is referred to as an action potential. This electrical signal is a relatively rapid, transient, nerve impulse, having an amplitude of roughly 100 mV and a duration of about 1 ms. In a particular embodiment of a neural system having a series of connected neurons (e.g., the transfer of spikes from one level of neurons to another in FIG. 1), every action potential has basically the same amplitude and duration, and thus, the information in the signal may be represented only by the frequency and number of spikes, or the time of spikes, rather than by the amplitude. The information carried by an action potential may be determined by the spike, the neuron that spiked, and the time of the spike relative to other spike or spikes. The importance of the spike may be determined by a weight applied to a connection between neurons, as explained below.

The transfer of spikes from one level of neurons to another may be achieved through the network of synaptic connections (or simply "synapses") 104, as illustrated in FIG. 1. Relative to the synapses 104, neurons of level 102 may be considered presynaptic neurons and neurons of level 106 may be considered postsynaptic neurons. The synapses 104 may receive output signals (e.g., spikes) from the level 102 neurons and scale those signals according to adjustable synaptic weights $w_1^{(i,i+1)}, \ldots, w_P^{(i,i+1)}$ where P is a total number of synaptic connections between the neurons of levels 102 and 106 and i is an indicator of the neuron level. In the example of FIG. 1, i represents neuron level 102 and i+1 represents neuron level 106. Further, the scaled signals may be combined as an input signal of each neuron in the level 106. Every neuron in the level 106 may generate output spikes 110 based on the corresponding combined input signal. The output spikes 110 may be transferred to another level of neurons using another network of synaptic connections (not shown in FIG. 1).

Biological synapses can mediate either excitatory or inhibitory (hyperpolarizing) actions in postsynaptic neurons and can also serve to amplify neuronal signals. Excitatory signals depolarize the membrane potential (e.g., increase the membrane potential with respect to the resting potential). If enough excitatory signals are received within a certain time period to depolarize the membrane potential above a threshold, an action potential occurs in the postsynaptic neuron. In contrast, inhibitory signals generally hyperpolarize (e.g., lower) the membrane potential. Inhibitory signals, if strong enough, can counteract the sum of excitatory signals and prevent the membrane potential from reaching a threshold. In addition to counteracting synaptic excitation, synaptic inhibition can exert powerful control over spontaneously active neurons. A spontaneously active neuron refers to a neuron that spikes without further input, for example due to its dynamics or a feedback. By suppressing the spontaneous generation of action potentials in these neurons, synaptic inhibition can shape the pattern of firing in a neuron, which is generally referred to as sculpturing. Tue various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, where synaptic weight changes may relate to changes of the memristor resistance. With nanometer feature-sized memristors, the area of a neuron circuit and synapses may be substantially reduced, which may make implementation of a large-scale neural system hardware implementation more practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, where a particular functionality may be based on synaptic weights stored in a memory card currently attached to the neural processor.

Figure 2:
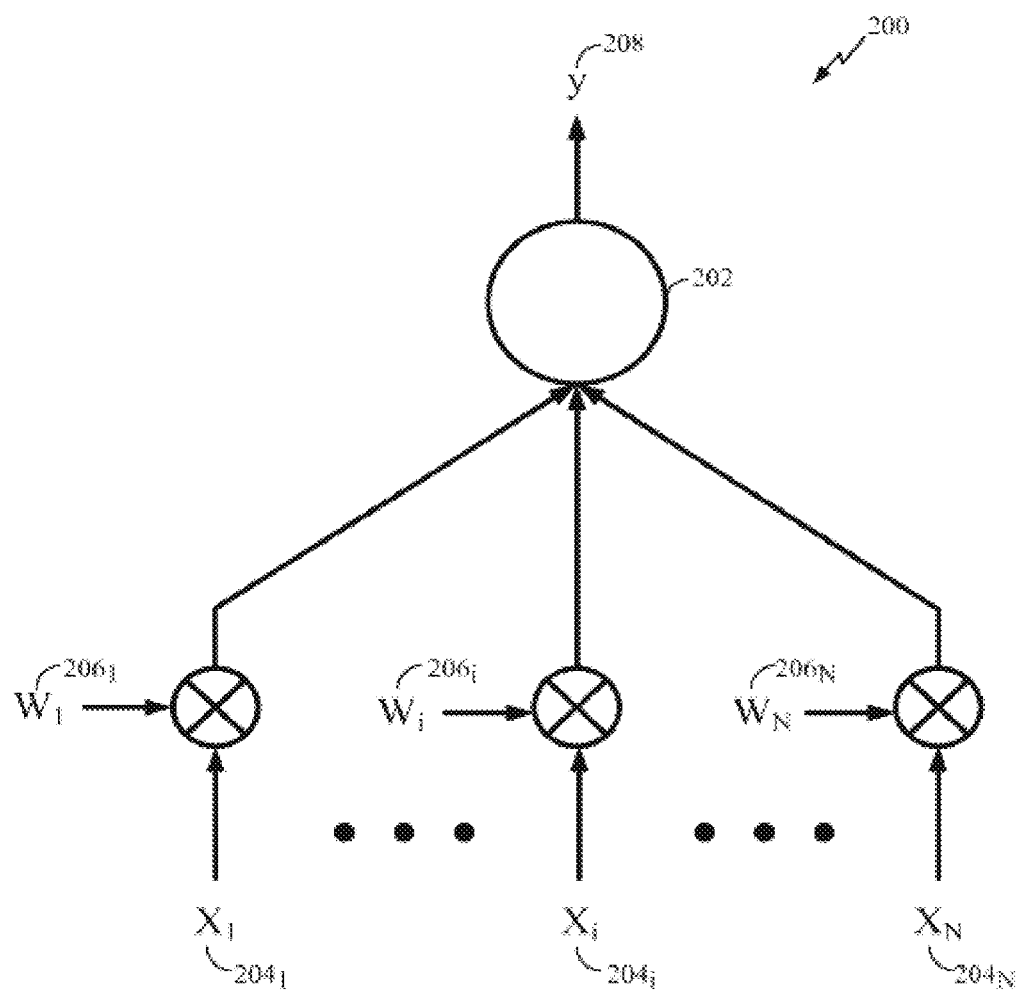
FIG. 2 illustrates an example of a processing unit (neuron) of a computational network (neural system or neural network) in accordance with certain aspects of the present disclosure.

FIG. 2 illustrates an exemplary diagram 200 of a processing unit (e.g., a neuron or neuron circuit) 202 of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$, which may be signals external to the neural system, or signals generated by other neurons of the same neural system, or both. The input signal may be a current, a conductance, a voltage, a real-valued, and/or a complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($W_1$-$W_N$), where N may be a total number of input connections of the neuron 202.

The neuron 202 may combine the scaled input signals and use the combined scaled inputs to generate an output signal 208 (i.e., a signal Y). The output signal 208 may be a current, a conductance, a voltage, a real-valued and/or a complex-valued. The output signal may be a numerical value with a fixed-point or a floating-point representation. The output signal 208 may be then transferred as an input signal to other neurons of the same neural system, or as an input signal to the same neuron 202, or as an output of the neural system.

The processing unit (neuron) 202 may be emulated by an electrical circuit, and its input and output connections may be emulated by electrical connections with synaptic circuits. The processing unit 202 and its input and output connections may also be emulated by a software code. The processing unit 202 may also be emulated by an electric circuit, whereas its input and output connections may be emulated by a software code. In an aspect, the processing unit 202 in the computational network may be an analog electrical circuit. In another aspect, the processing unit 202 may be a digital electrical circuit. In yet another aspect, the processing unit 202 may be a mixed-signal electrical circuit with both analog and digital components. The computational network may include processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2 may be initialized with random values and increased or decreased according to a learning rule. Those skilled in the art will appreciate that examples of the learning rule include, but are not limited to the spike-timing-dependent plasticity (STDP) learning rule, the Hebb rule, the Oja rule, the Bienenstock-Copper-Munro (BCM) rule, etc. In certain aspects, the weights may settle or converge to one of two values (i.e., a bimodal distribution of weights). This effect can be utilized to reduce the number of bits for each synaptic weight, increase the speed of reading and writing from/to a memory storing the synaptic weights, and to reduce power and/or processor consumption of the synaptic memory.

Synapse Type

In hardware and software models of neural networks, the processing of synapse related functions can be based on synaptic type. Synapse types may be non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of multiple types is that processing can be subdivided. For example, non-plastic synapses may not use plasticity functions to be executed (or waiting for such functions to complete). Similarly, delay and weight plasticity may be subdivided into operations that may operate together or separately, in sequence or in parallel. Different types of synapses may have different lookup tables or formulas and parameters for each of the different plasticity types that apply. Thus, the methods would access the relevant tables, formulas, or parameters for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) s structural plasticity (i.e., an amount of delay change) may be a direct function of pre-post spike time difference. Alternatively, structural plasticity may be set as a function of the weight change amount or based on conditions relating to bounds of the weights or weight changes. For example, a synapse delay may change only when a weight change occurs or if weights reach zero but not if they are at a maximum value. However, it may be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as for computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity and homeostatic plasticity.

STDP is a learning process that adjusts the strength of synaptic connections between neurons. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. On the other hand, long-term depression (LTD) may occur if an input spike tends, on average, to occur immediately after an output spike. Then, that particular input is made somewhat weaker, and hence the name "spike-timing-dependent plasticity." Consequently, inputs that might be the cause of the postsynaptic neuron's excitation are made even more likely to contribute in the future, whereas inputs that are not the cause of the postsynaptic spike are made less likely to contribute in the future. The process continues until a subset of the initial set of connections remains, while the influence of all others is reduced to an insignificant level.

Because a neuron generally produces an output spike when many of its inputs occur within a brief period (i.e., being cumulative sufficient to cause the output), the subset of inputs that typically remains includes those that tended to be correlated in time. In addition, because the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a presynaptic neuron to a postsynaptic neuron as a function of time difference between spike time $t_{pre}$ of the presynaptic neuron and spike time $t_{post}$ of the postsynaptic neuron (i.e., $t=t_{post}-t_{pre}$). A typical formulation of the STDP is to increase the synaptic weight (i.e., potentiate the synapse) if the time difference is positive (the presynaptic neuron fires before the postsynaptic neuron), and decrease the synaptic weight (i.e., depress the synapse) if the time difference is negative (the postsynaptic neuron fires before the presynaptic neuron).

In the STDP process, a change of the synaptic weight over time may be typically achieved using an exponential decay, as given by:

$$\Delta w(t) = \begin{cases} a_+ e^{-t/k} + \mu, & t > 0 \\ a_- e^{t/k}, & t < 0 \end{cases}, \quad (1)$$

where $k_+$ and $k\_\tau_{sign(\Delta t)}$ are time constants for positive and negative time difference, respectively, $\alpha_+$ and $\alpha_-$ are corresponding scaling magnitudes, and $\mu$ is an offset that may be applied to the positive time difference and/or the negative time difference.

Figure 3:
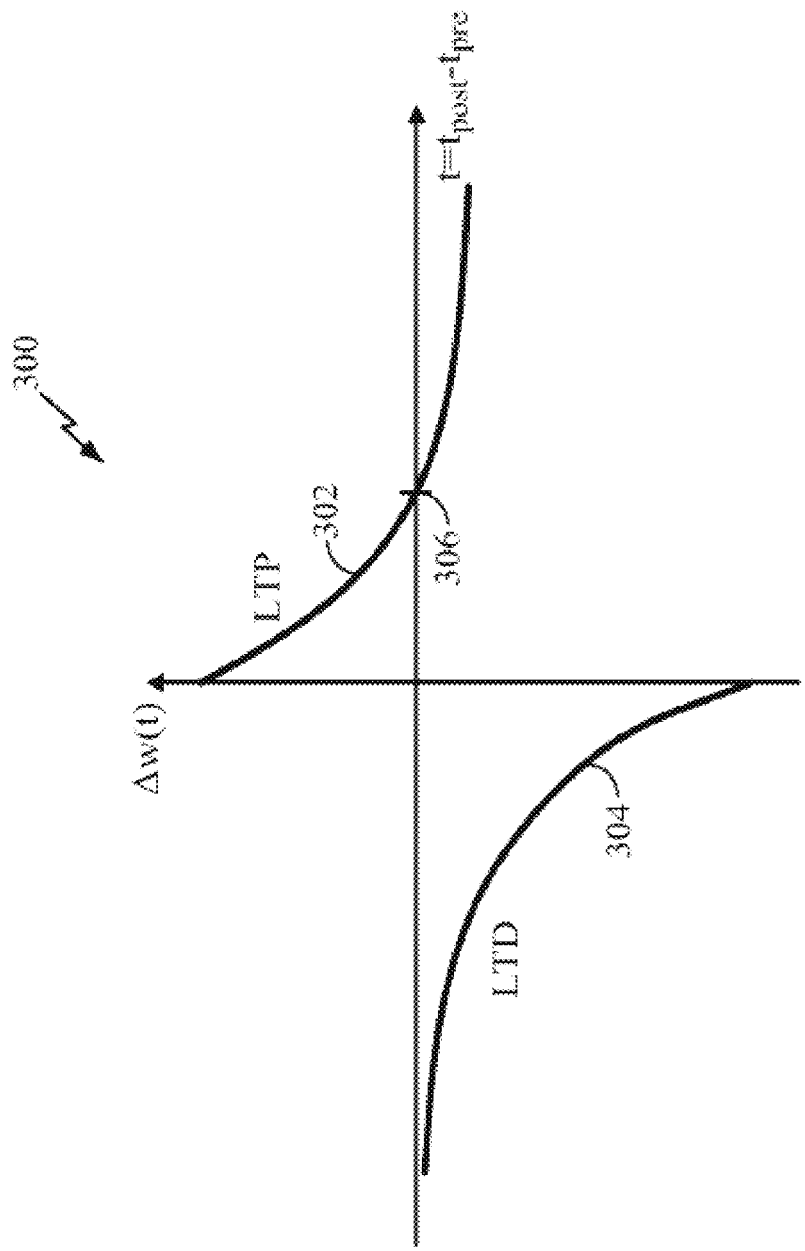
FIG. 3 illustrates an example of spike-timing dependent plasticity (STDP) curve in accordance with certain aspects of the present disclosure.

FIG. 3 illustrates an exemplary diagram 300 of a synaptic weight change as a function of relative timing of presynaptic and postsynaptic spikes in accordance with the STDP. If a presynaptic neuron fires before a postsynaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between presynaptic and postsynaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1. In the case of a frame-based input (i.e., an input that is in the form of a frame of a particular duration comprising spikes or pulses), the offset value $\mu$ can be computed to reflect the frame boundary. A first input spike (pulse) in the frame may be considered to decay over time either as modeled by a postsynaptic potential directly or in terms of the effect on neural state. If a second input spike (pulse) in the frame is considered correlated or relevant to a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any), can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics:

$$\frac{dv_n(t)}{dt} = \alpha v_n(t) + \beta \sum_m w_{m,n} y_m(t - \Delta t_{m,n}), \qquad (2)$$

where $\alpha$ and $\beta$ are parameters, $w_{m,n}$ is a synaptic weight for the synapse connecting a presynaptic neuron m to a postsynaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a postsynaptic neuron is established until the time when the postsynaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e.:

$$\frac{dv}{dt} = (k(v - v_t)(v - v_r) - u + I)/C, \qquad (3)$$

$$\frac{du}{dt} = a(b(v - v_r) - u), \qquad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$, is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in a biologically-consistent linear fashion. The time constant in the supra-threshold regime, positive by convention, reflects anti-leaky channel dynamics generally driving a cell to spike while incurring latency in spike-generation.

Figure 4:
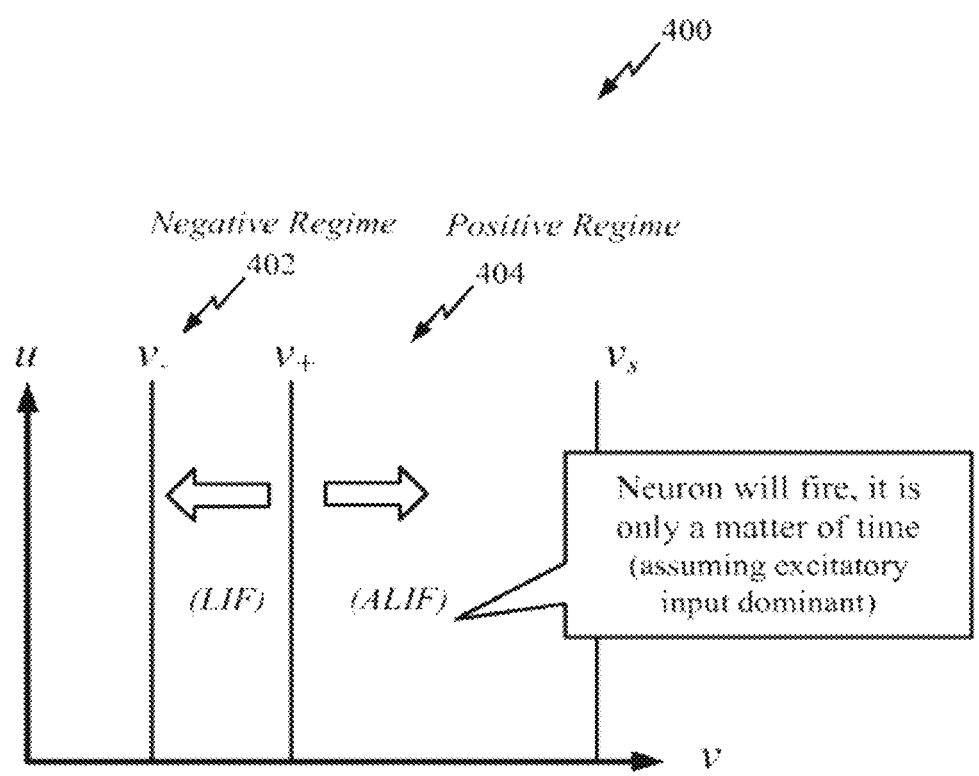
FIG. 4 illustrates an example of a positive regime and a negative regime for defining behavior of a neuron model in accordance with certain aspects of the present disclosure.

As illustrated in FIG. 4, the dynamics of the model 400 may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event (vs). In this positive regime, the model exhibits computational properties, such as incurring a latency to spike depending on subsequent input events.

Formulation of dynamics in terms of events and separation of the dynamics into these two regimes are fundamental characteristics of the model.

Linear dual-regime bi-dimensional dynamics (for states v and u) may be defined by convention as:

$$\tau_\rho \frac{dv}{dt} = v + q_p \quad (5)$$

$$-\tau_u \frac{du}{dt} = u + r, \quad (6)$$

Where $q_p$ and r are the linear transformation variables for coupling.

The symbol ρ is used herein to denote the dynamics regime with the convention to replace the symbol ρ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and τ+), which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are:

$$q_\rho = -\tau_\rho \beta u - v_\rho \quad (7)$$

$$r = \delta(v + \varepsilon), \quad (8)$$

where δ, ε, β, and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter δ is a scale factor controlling the slope of the u null-cline. The parameter ε is typically set equal to $-v_-$. The parameter β is a resistance value controlling the slope of the v null-clines in both regimes. The $\tau_\rho$ time-constant parameters control not only the exponential decays, but also the null-cline slopes in each regime separately.

The model may be defined to spike when the voltage v reaches a value $v_s$. Subsequently, the state may be reset at a reset event (which may be one and the same as the spike event):

$$v = \hat{v}_- \quad (9)$$

$$u = u + \Delta u, \quad (10)$$

where $\hat{v}_-$ and Δu are parameters. The reset voltage $\hat{v}_-$ is typically set to $v_-$.

By a principle of momentary coupling, a closed form solution is possible not only for state (and with a single exponential term), but also for the time to reach a particular state. The close form state solutions are:

$$v(t + \Delta t) = (v(t) + q_\rho)e^{\frac{\Delta t}{\tau_\rho}} - q_\rho \quad (11)$$

$$u(t + \Delta t) = (u(t) + r)e^{-\frac{\Delta t}{\tau_u}} - r. \quad (12)$$

Therefore, the model state may be updated only upon events, such as an input (presynaptic spike) or output (postsynaptic spike). Operations may also be performed at any particular time (whether or not there is input or output).

Moreover, by the momentary coupling principle, the time of a postsynaptic spike may be anticipated so the time to reach a particular state may be determined in advance without iterative techniques or Numerical Methods (e.g., the Euler numerical method). Given a prior voltage state v0, the time delay until voltage state $v_f$ is reached is given by:

$$\Delta t = \tau_\rho \log \frac{v_f + q_\rho}{v_0 + q_\rho}, \quad (13)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily utilize iterative methods or Numerical methods. An event-based implementation is also possible at a limited time resolution in a step-based simulator by only updating the model if an event occurs at or between steps or by "step-event" update.

Decomposing Convolution Operation in Neural Networks

Deep Convolution Networks (DCNs) are widely used in many Computer Vision applications including Object Classification, Object Localization, Face Recognition and Scene Recognition. Convolution operations are one of the most computationally intensive blocks in DCNs.

A convolution operation may be understood on one dimensional (1-D) arrays. An input vector X of length N may be convolved with a filter W of length M to produce an output vector Y=X*W of length N−M+1:

$$y_k = \Sigma_{i=0}^{M-1} x_{k+1} w_i, k=0,1,\ldots,N-M, \quad (15)$$

Where M and N are integer values.

Ignoring additions, the computational complexity may be expressed in terms of the number of multiplications. The number of multiplications in the above operation is equal to (N−M)*M. Assuming that the filter size is smaller in comparison to input size, the number of multiplications is of the order of O(NM) multiplications using big-O notation.

In Deep Convolution Networks, the convolution operation may be performed on 2-D matrices instead of 1-D vectors. For example, an input matrix X of dimensions $N_1 \times N_2$ may be convolved with a filter matrix W of dimensions $M_1 \times M_2$ to produce an output matrix Y of dimensions $(N_1-M_1+1) \times (N_2-M_2+1)$ as follows:

$$y_k = \sum_{i=0}^{M_1-1} \sum_{i=0}^{M_2-1} x_{k+i,j} w_{i,j}, \qquad (16)$$

$$k = 0, 1, \ldots, N_1 - M_1, l = 0, 1, \ldots, N_2 - M_2$$

The computational complexity may be on the order of $O(N_1 N_2 M_1 M_2)$ multiplications. If the matrices are square, i.e., $N_1 = N_2 = N$ and $M_1 = M_2 = M$, then the computational complexity is of the order of $O(N^2 M^2)$.

Decomposing 2-D Convolution Operation

Depending on the rank of the filter matrix W, the 2-D convolution operation may be expressed as a composition of 1-D convolution operations. For example, the filter matrix W may be expressed as a linear combination of rank one matrices using Singular Value Decomposition (SVD):

$$W = \sum_{r=1}^{rank(W)} W_r. \qquad (17)$$

In this example, rank(W) denotes the rank of the matrix W, and the matrices $W_1, W_2, \ldots, W_{rank(W)}$ are all unit rank matrices. Further, each of the unit rank matrices may be expressed as a product of a column vector times a row vector.

In one example, suppose $W_i = U_i V_i^\tau$ where $U_\epsilon$ is a column vector and $V_i^\tau$ is a row vector. Then the 2-D convolution operation $X * W_t$ may be decomposed by first convolving each column of matrix X with the column vector $U_i$ and then convolving each row of the resulting matrix with the row vector $V_i^\tau$.

This method of computing 2-D convolution with a unit rank matrix using two 1-D convolutions has a computational complexity:

$$N_2 O(N_1 M_1) + (N_1 0(N_2 M_2) = O(N_1 N_2 (M_1+M_2)).$$

Because the column and row convolution operations are repeated for each of the unit rank matrices, the overall computational complexity of this approach may be expressed as:

$$O(rank(W)N_1 N_2)(M_1+M_2)).$$

In the case of square matrices, this is equal O (2rank(W) $N^2 M$). This is in comparison with $O(N^2 M^2)$, which is the computational complexity of a 2-D convolution operation.

The decomposition method may be efficient if the filter matrix W has a small rank (rank(W)) and has larger dimensionality (M). For instance, consider the example where the filter matrix is of size 16×16 and has a rank of 2, then $O(2*2*16*N^2) = O(64N^2)$ multiplications using the decomposition method is compared to $O(256N^2)$ multiplications using the traditional method. If the filter matrix W had a unit rank, then the comparison is between $O(32N^2)$ multiplications and $O(256N^2)$ multiplications.

In accordance with some aspects of the present disclosure, the method of decomposing 2-D convolution operations into 1-D convolution operations may be applied to DCNs in the following ways:

In one aspect, a DCN may be trained using any training technique. At the end of training, a rank of the filter matrices may be computed. It can be determined whether to implement the 2-D convolution operation using the decomposition method by comparing $O(N_1 N_2 M_1 M_2)$ to $O(rank(W) N_1 N_2 (M_1+M_2))$.

In some aspects, the DCN may be subjected to pre-processing such that filter matrices may be replaced by a low rank approximation. The filter weight matrix may be approximated using only the top few unit rank matrices:

$$W \approx \sum_{r=1}^{R} U V_\tau^T \qquad (18)$$

Here, R can be as small as one, or can be selected based on the energy distribution of the singular values. Typically, most of the energy is concentrated in the top few singular values. In some aspects, R may be empirically chosen. For example, R may be chosen based on the overall classification performance of the DCN by trying different values for R. That is, the final value of R may be determined according to computing accuracy on a validation dataset for different values of R. The lowest value of R with negligible performance degradation may be selected.

After the low rank approximation, a pre-trained classifier may be used or the classifier may be re-trained.

In another aspect, the training process may be encouraged to converge to unit rank or low rank filter weight matrices. A filter may be deemed to have a low rank if the rank<K/2, where K is the size of the filter weight matrix, for example. Another example of a low rank filter is a Gabor filter which may be expressed as follows:

$$W_{xy} = \exp\left(-\frac{x^2+y^2}{2\sigma^2}\right) \cos(2\pi f(x\cos\theta + y\sin\theta)) \qquad (19)$$

The Gabor filter matrix has a rank of one and is therefore separable if θ=0, 90, 180, or 270. On the other hand, the rank of the Gabor filter is two for all other values of θ. In this case, the Gabor filter is the sum of two separable filters.

In one exemplary aspect, the unit or low rank filter matrices may be encouraged by adding a regularizer term (e.g., cost function) to the objective function so as to penalize high rank matrices. For example, a nuclear norm may be used to reduce the rank. The nuclear norm is the sum of singular values and may be expressed as:

$$\|W\|_* = \Sigma \sigma_i = \text{trace}(\sqrt{W^T W}), \qquad (20)$$

Where $\sigma_i$ are the singular values and $\lambda \|W\|_*$ is added to the objective function for each filter, where λ is the cost function. Accordingly, a weight decay term of $$-\lambda \frac{\partial \|W\|_*}{\partial w_{ij}}$$

is added to the gradient update equation. Of course, other regularizers may also be used to reduce the filter rank. Having reduced the filter rank, the decomposed convolution may be applied.

In another exemplary aspect, a certain rank for the filter weight matrices (e.g., unit or low rank) may be enforced, and back propagation (or equivalently gradient descent) may be applied to compute updates on these enforced matrices.

For example, suppose the filter matrix is forced to be of unit rank. Then W takes the form of $UV^T$, where U is a column vector and V is a row vector. The elements $w_{ij}$ may not be free variables, but instead may be derived variables based on the free variables $u_j$ and $v_j$:

$$w_{ij} = u_i v_j \tag{21}$$

A back propagation process may be applied to compute the partial gradients with respect to the elements $w_{ij}$. The partial gradients with respect to the elements $w_{ij}$ may, in turn, be used to compute the partial gradients with respect to the free variables $u_i$ and $v_j$ in the following way:

$$\frac{\partial L}{\partial u_i} = \sum_j \frac{\partial L}{\partial w_{ij}} \frac{\partial w_{ij}}{\partial u_i} = \sum_j \frac{\partial L}{\partial w_{ij}} v_j \tag{22}$$

$$\frac{\partial L}{\partial v_j} = \sum_i \frac{\partial L}{\partial w_{ij}} \frac{\partial w_{ij}}{\partial v_j} = \sum_i \frac{\partial L}{\partial w_{ij}} u_i \tag{23}$$

where L represents the loss (or objective) function that is being reduced. These partial gradients may be used to update the variables $u_i$ and $v_j$ and essentially perform a gradient descendent in the space of unit rank weight matrices. Thus, the resulting trained DCN will have unit rank matrices and the decomposition method may be employed to efficiently implement the convolution operations.

In another exemplary aspect, an arbitrary rank (r) on the filter matrices maybe enforced instead of enforcing the filter matrices to be of unit rank. The back propagation process to compute the partial gradients may be performed to determine updates for variables $u_i$ and $v_j$, as discussed above.

In some aspects, the same weight updates for each of the contributing unit rank matrices and a random initial condition for diversity may be used. In another aspect, an additional constraint that the r column vectors are orthogonal to each other and the r row vectors are orthogonal to each other may be used to encourage diversity.

In some aspects, it may be desirable to reuse separable filters. For example, where a DCN has a number of filters operating on the same input, it may be beneficial to encourage reuse of the underlying filters. This may be achieved by configuring a bank of L separable filters $U_1 V_1^T$, $U_2 V_2^T, \ldots U_L V_L^T$. Each filter may be constrained to be a linear combination of a random subset of size R of the underlying filters:

$$w_p = \sum_{r \in S_p} \alpha_{pr} U_r V_r^T \tag{24}$$

where $S_p$ is the subset of separable filters used by filter p and $\alpha_{pr}$ is a linear combination parameter. Back propagation may be applied to learn the L separable filters and the linear combination parameter.

Figure 5:
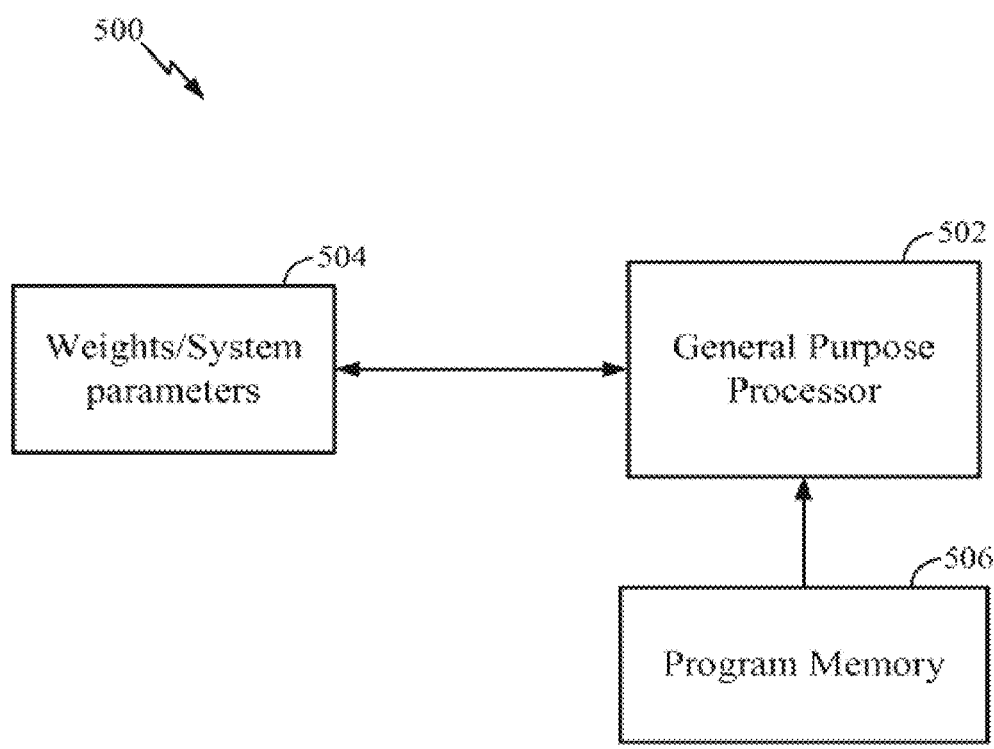
FIG. 5 illustrates an example implementation of designing a neural network using a general-purpose processor in accordance with certain aspects of the present disclosure.

FIG. 5 illustrates an example implementation 500 of the aforementioned decomposition using a general-purpose processor 502 in accordance with certain aspects of the present disclosure. Variables (neural signals), synaptic weights, system parameters associated with a computational network (neural network), delays, and frequency bin information may be stored in a memory block 504, while instructions executed at the general-purpose processor 502 may be loaded from a program memory 506. In an aspect of the present disclosure, the instructions loaded into the general-purpose processor 502 may comprise code for determining a number of separable filters to express a filter in the neural network and/or selectively applying a decomposed convolution to the filter.

In another aspect of the present disclosure, the instructions loaded into the general-purpose processor 502 may comprise code for encouraging one or more filters in the neural network to have a low rank.

Figure 6:
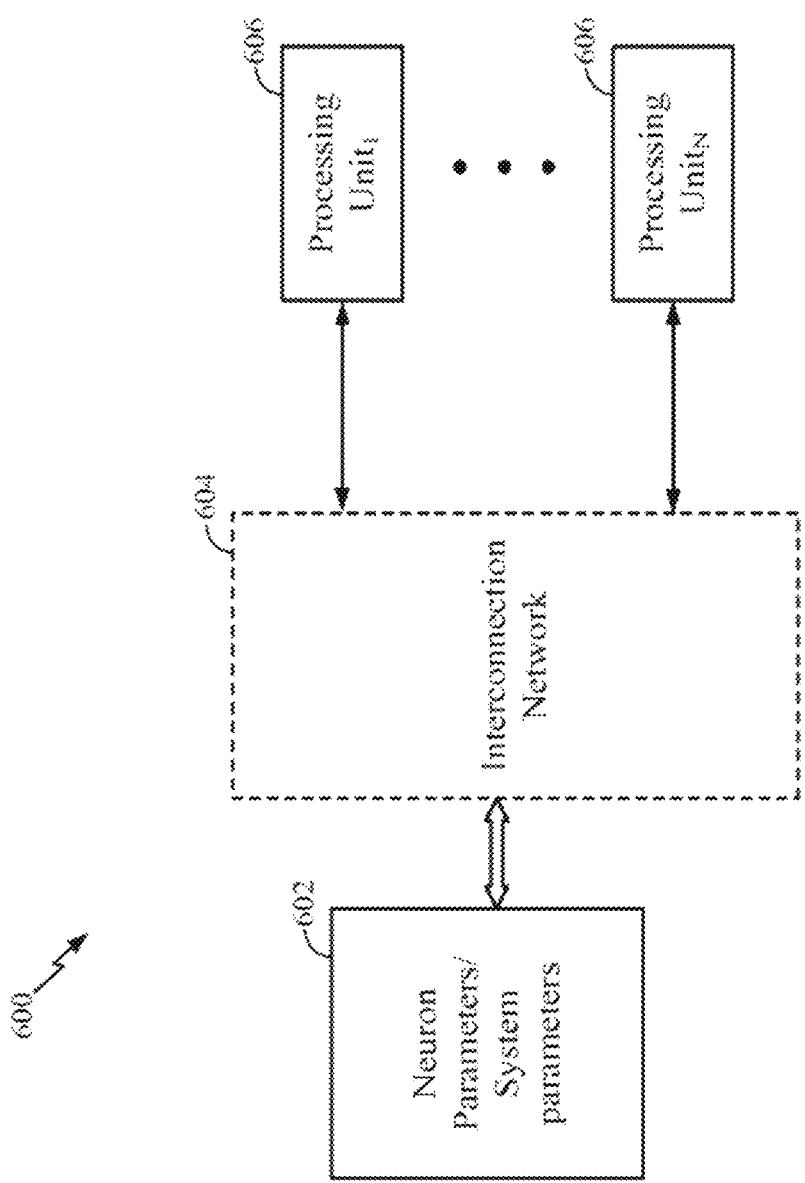
FIG. 6 illustrates an example implementation of designing a neural network where a memory may be interfaced with individual distributed processing units in accordance with certain aspects of the present disclosure.

FIG. 6 illustrates an example implementation 600 of the aforementioned decomposition techniques where a memory 602 can be interfaced via an interconnection network 604 with individual (distributed) processing units (neural processors) 606 of a computational network (neural network) in accordance with certain aspects of the present disclosure. Variables (neural signals), synaptic weights, system parameters associated with the computational network (neural network) delays, frequency bin information, regularization information and/or system metrics may be stored in the memory 602, and may be loaded from the memory 602 via connection(s) of the interconnection network 604 into each processing unit (neural processor) 606. In an aspect of the present disclosure, the processing unit 606 may be configured to determine a number of separable filters to express a filter in the neural network and/or selectively apply a decomposed convolution to the filter.

In another aspect of the present disclosure, the processing unit 606 may be configured to encourage one or more filters in the neural network to have a low rank.

Figure 7:
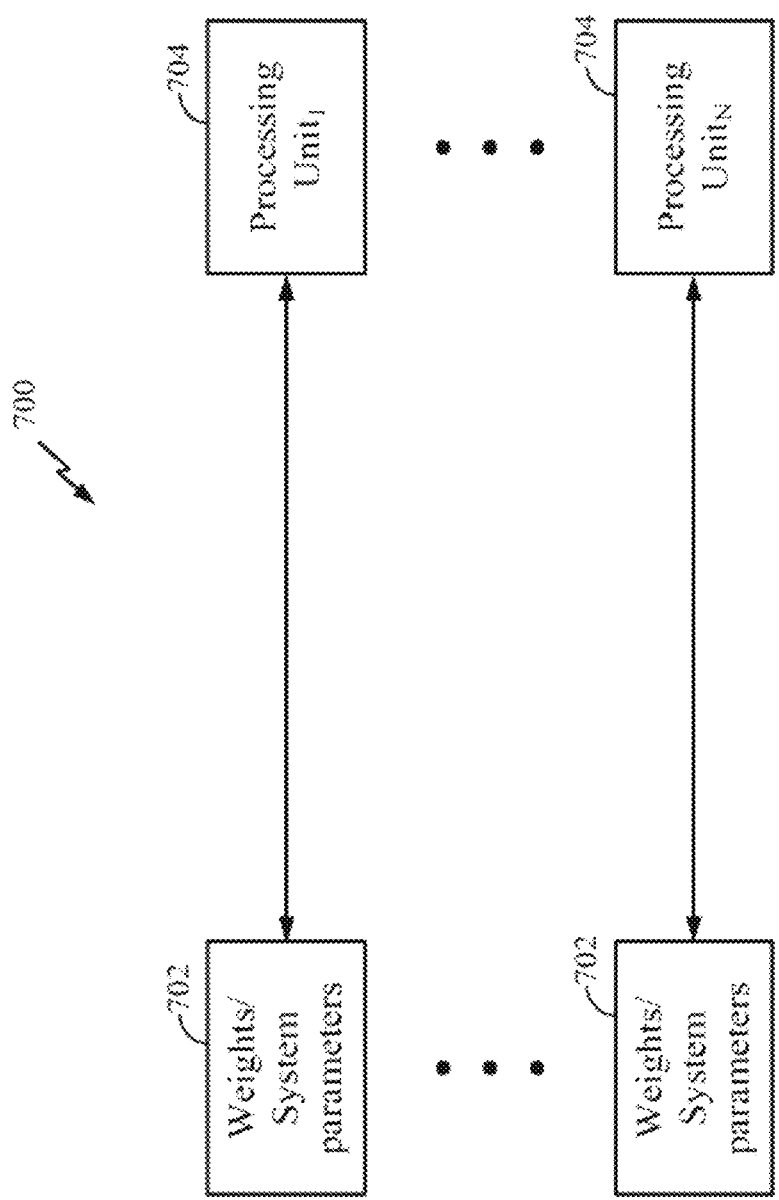
FIG. 7 illustrates an example implementation of designing a neural network based on distributed memories and distributed processing units in accordance with certain aspects of the present disclosure.

FIG. 7 illustrates an example implementation 700 of the aforementioned decomposition. As illustrated in FIG. 7, one memory bank 702 may be directly interfaced with one processing unit 704 of a computational network (neural network). Each memory bank 702 may store variables (neural signals), synaptic weights, and/or system parameters associated with a corresponding processing unit (neural processor) 704 delays, frequency bin information, regularization information and/or system metrics. In an aspect of the present disclosure, the processing unit 704 may be configured to determine a number of separable filters to express a filter in the neural network and/or selectively apply a decomposed convolution to the filter.

In another aspect of the present disclosure, the processing unit 704 may be configured to encourage one or more filters in the neural network to have a low rank.

Figure 8:
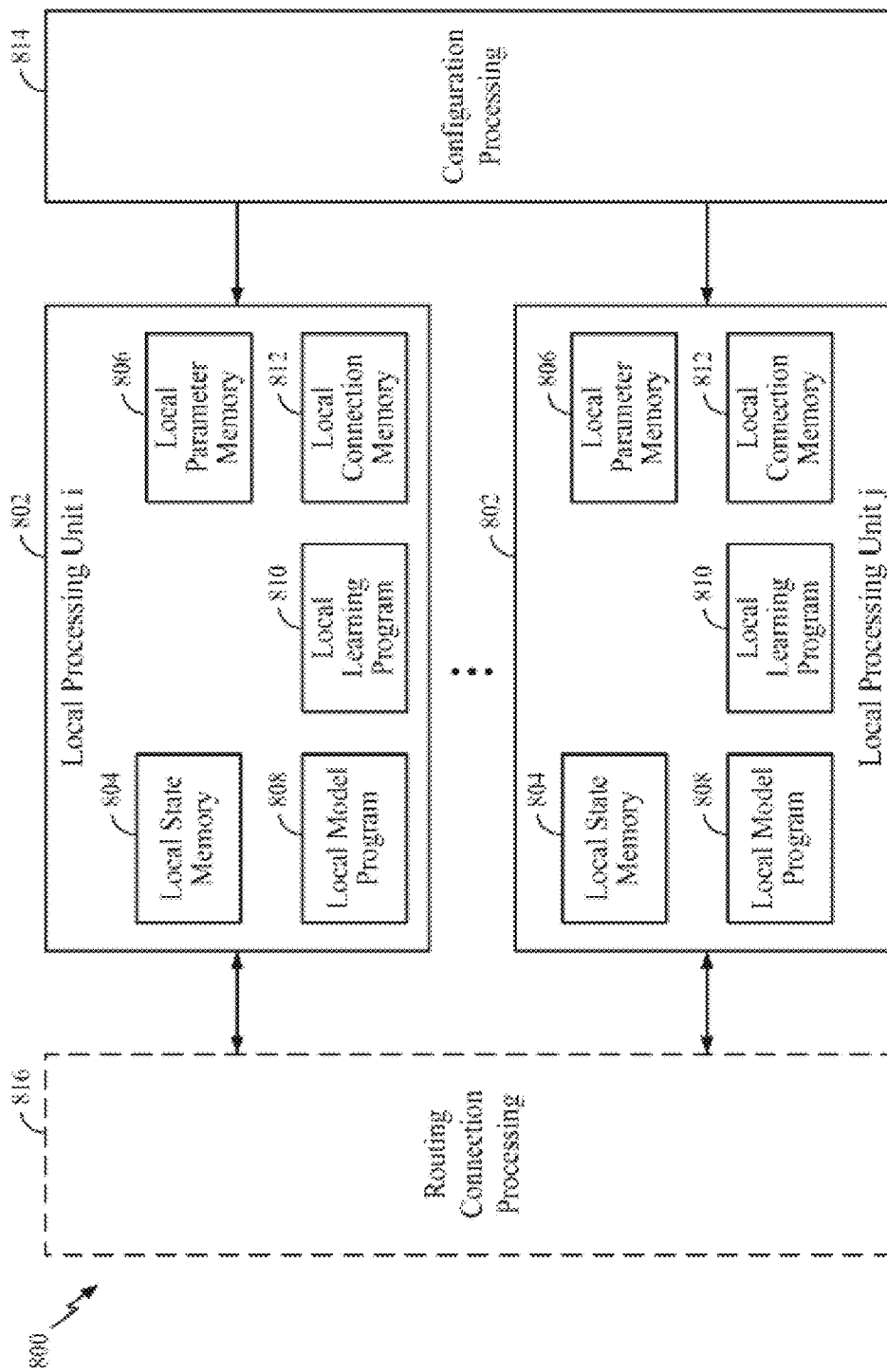
FIG. 8 illustrates an example implementation of a neural network in accordance with certain aspects of the present disclosure.

FIG. 8 illustrates an example implementation of a neural network 800 in accordance with certain aspects of the present disclosure. As illustrated in FIG. 8, the neural network 800 may have multiple local processing units 802 that may perform various operations of methods described herein. Each local processing unit 802 may comprise a local state memory 804 and a local parameter memory 806 that store parameters of the neural network. In addition, the local processing unit 802 may have a local (neuron) model program (LMP) memory 808 for storing a local model program, a local learning program (LLP) memory 810 for storing a local learning program, and a local connection memory 812. Furthermore, as illustrated in FIG. 8, each local processing unit 802 may be interfaced with a configuration processor unit 814 for providing configurations for local memories of the local processing unit, and with a routing connection processing unit 816 that provide routing between the local processing units 802.

In one configuration, a neuron model is configured for determining a number of separable filters to express a filter in the neural network and selectively applying a decomposed convolution to the filter. The neuron model includes determining means and applying means. In one aspect, the determining means and/or applying means may be the general-purpose processor 502, program memory 506, memory block 504, memory 602, interconnection network 604, processing units 606, processing unit 704, local processing units 802, and or the routing connection processing units 816 configured to perform the functions recited. In another configuration, the aforementioned means may be any module or any apparatus configured to perform the functions recited by the aforementioned means.

In another configuration, a neuron model is configured for encouraging one or more filters in the neural network to have a low rank and applying a decomposed convolution to the filter(s) to train the neural network. The neuron model includes encouraging means and applying means. In one aspect, the encouraging means and/or applying means may be the general-purpose processor 502, program memory 506, memory block 504, memory 602, interconnection network 604, processing units 606, processing unit 704, local processing units 802, and or the routing connection processing units 816 configured to perform the functions recited. In another configuration, the aforementioned means may be any module or any apparatus configured to perform the functions recited by the aforementioned means.

According to certain aspects of the present disclosure, each local processing unit 802 may be configured to determine parameters of the neural network based upon desired one or more functional features of the neural network, and develop the one or more functional features towards the desired functional features as the determined parameters are further adapted, tuned and updated.

Figure 9:
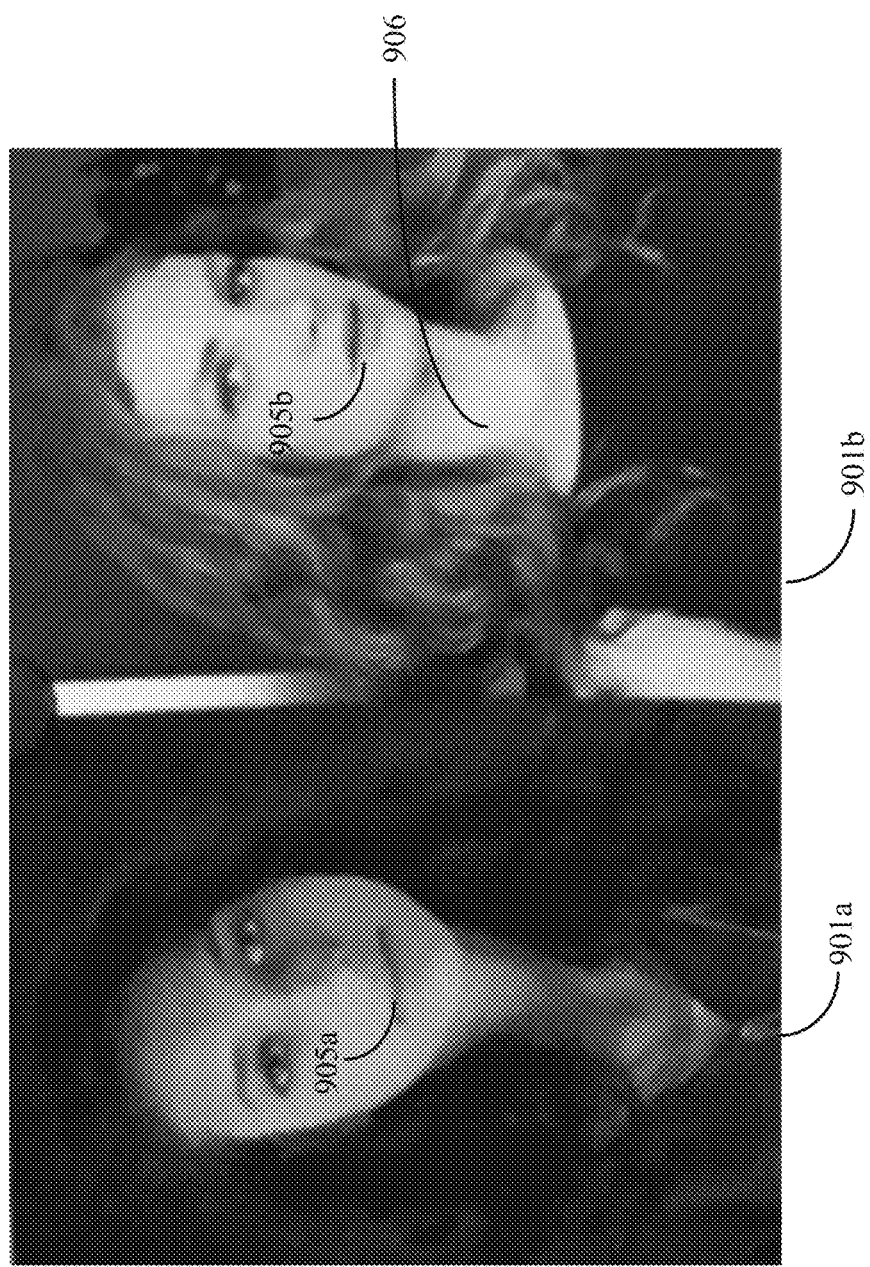
FIG. 9 shows two example images.

FIG. 9 shows two images 901*a-b*. The two images may have been captured in imaging conditions with a relatively low level of lighting. As such, light reflecting from features of the women within the images may be received at an imaging sensor capturing the images at similar levels as noise within the imaging sensor. Thus, due to the lower light conditions, some features, such as details and textures, may be lost due to the lower light conditions. For example, detail in the women's lips 905*a-b* and the skin tone 906 may be degraded as compared to images captured under higher light conditions.

Figure 10:
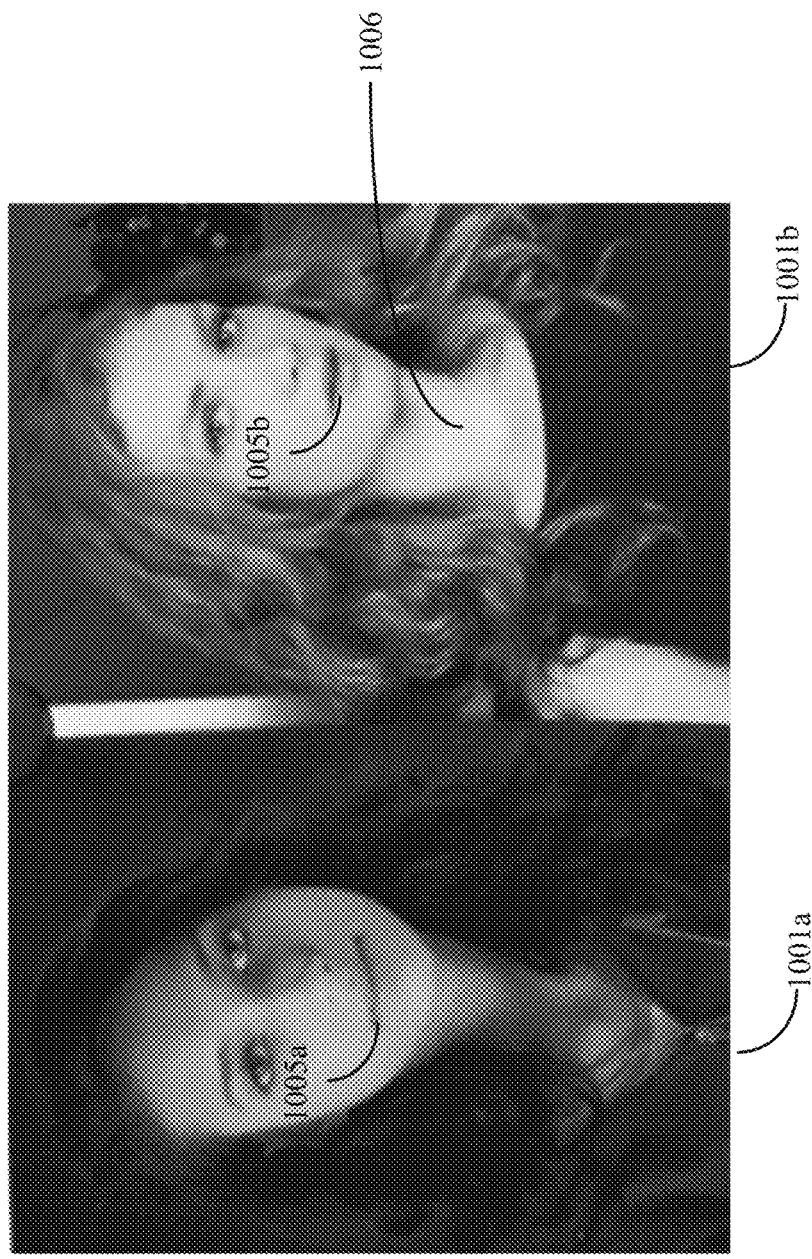
FIG. 10 shows the two images of FIG. 9 after processing by the disclosed methods and systems.

FIG. 10 shows the two images of FIG. 9 after processing by the disclosed methods and systems. The two images 1001*a-b*, corresponding to images 901*a-b* in FIG. 9, show improved detail when compared to the images 901*a-b* of FIG. 9. For example, facial features such the lips 1005*a-b* of FIG. 10 are improved relative to lips 905*a-b* of FIG. 9. The woman's skin tone 1006 in image 1001*b* is also improved relative to the skin tone 906 in image 901*b*.

Figure 11:
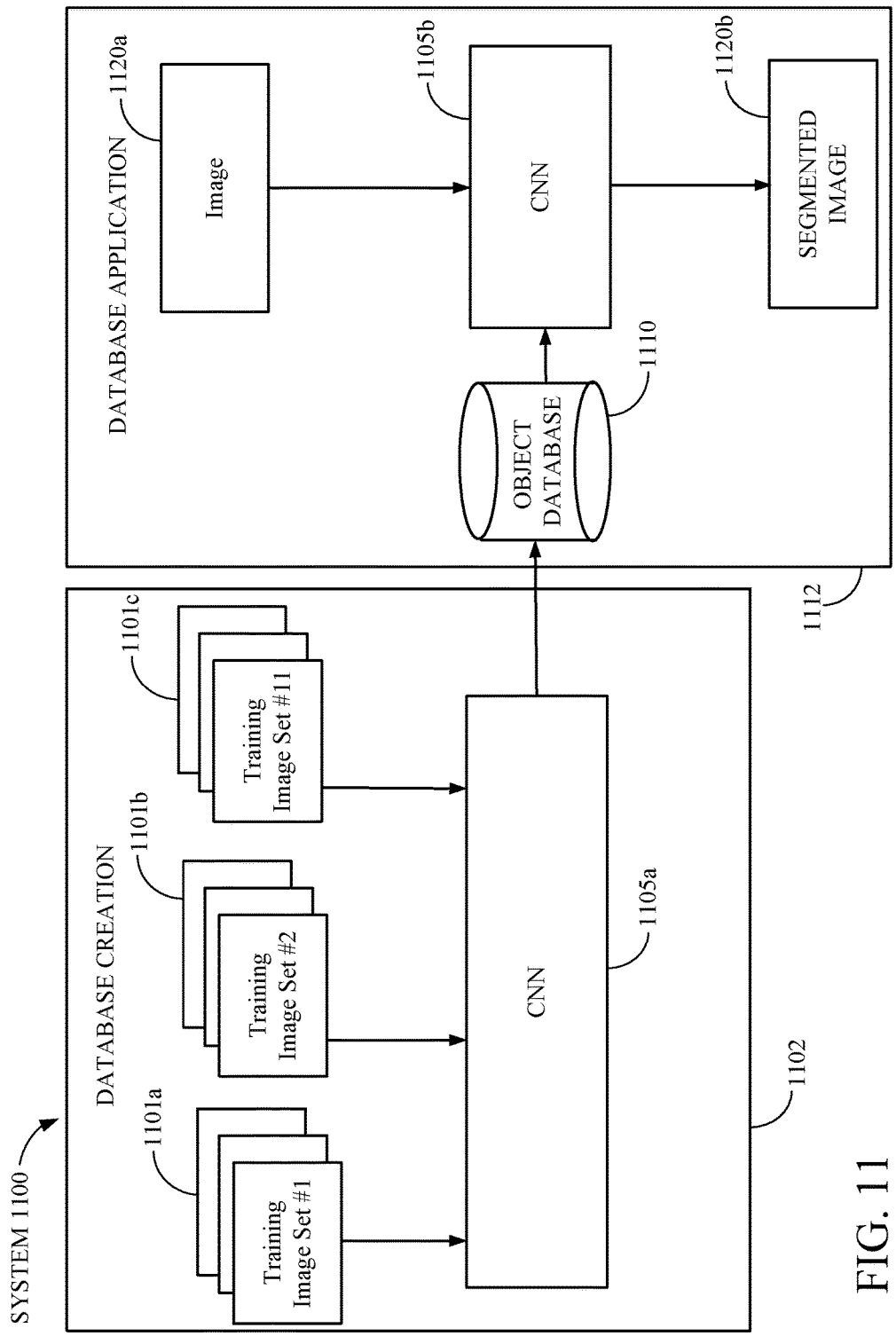
FIG. 11 shows an image processing system that utilizes a convolutional neural network (CNN).

FIG. 11 shows an image processing system that utilizes a convolutional neural network (CNN), such as any of the convolutional neural networks discussed above. The system 1100 includes a database factory 1102 that generates an object database 1110. The object database 1110 may include data defining a convolutional neural network model. In some aspects, the object database 1110 may be utilized by a separate device, such as device 1112 to identify one or more objects in an image.

The system 1100 also includes convolutional neural network processing 1105*a*, that is provided with a plurality of training image sets, shown in FIG. 11 as 1101*a-c*. The CNN processing 1105*a* may be comprised of instructions that configure a hardware processor to perform the functions discussed with respect to a CNN in this disclosure. For example, the convolutional neural network may include a plurality of processing layers. Each layer of processing may include one or more filters. Each of the one or more filters may be configured to extract certain unique content features from an image applied to the CNN. In some aspects, higher layers of the network may be configured to capture high-level content in terms of objects and their arrangement in an input image. These higher layers may not constrain pixel values within an image. Lower layers in the CNN may be configured to reproduce pixel values of the original image.

Since the training image sets 1101*a-c* include objects of known types, the known type information is also provided to the CNN 1105*a* along with the training sets themselves. Images that also do not include the known types of objects may also be provided to the CNN 1105*a*, so that the CNN can determine differences between images that contain a type of object and images that do not contain that type of object. For example, the processing layers within the CNN may each generate unique outputs for images including particular features, and other unique outputs for images not including those particular features. The combination of filter outputs for a particular image enable the CNN to generate signatures of training images 1105*a* representing objects having certain characteristics. These image signatures, or outputs of the filters within each layer of the CNN may then be stored to the object database 1110. An example of a convolutional neural network that works in this manner is the VGG-Network, as described in Simonyan, K. & Zisserman, A., *Very Deep Convolutional Networks for Large-Scale Image Recognition.*, arXiv: 1409.1556 [cs] (2014).

In some aspects, a first training set such as 1101*a* may provide a variety of images of a first type of object, while a second training set such as 1101*b* may provide a variety of images of a second type of object, and a third training set such as 1101*c* provides a variety of images of a third type of object. For example, training set 1101*a* may provide multiple images of a sky. The images may show sky as it appears in various lighting conditions for example. Training set 1101*b* may provide multiple images of a type of tree. For example, the images may show the tree from different perspectives or at different times of the year, or at different levels of maturity or health for example. The training set 1101*c* may provide multiple images of grass. The convolutional neural network 1105*a* may process the series of training image sets 1101*a-c* and generate signatures for each set of images based on outputs of filters included in each layer of the CNN. These signatures may include similarities and differences between images within each of the individual training sets 1101*a-b*. Characteristics determined to be different may not be associated with the object type, while characteristics similar between the various images in the training set may be associated with objects of the particular type by the CNN. These similar characteristics may define what makes a tree a tree to the CNN 1105*a*. Data defining these similar characteristics of images within one of the training sets 1101*a-c* may be stored in an object database 1110.

An image with unknown characteristics 1120*a* may then be provided to convolutional neural network processing logic 1105*b*. In some aspects, the logic 1105*b* may include instructions that configure one or more hardware processors to perform functions of a convolutional neural network. Based on the characteristics found to define the one or more objects provided in the training sets 1101a-b, the convolutional neural network 1105b may identify one or more objects in the image 1120a. The result is an image segmentation 1120b, which indicates a location of known objects that have been identified by the CNN 1105b via the object database 1110.

In some aspects, the CNN 1105a and/or CNN 1105b may be utilize a VGG-Network, as described in Simonyan, K. & Zisserman, A., *Very Deep Convolutional Networks for Large-Scale Image Recognition.*, arXiv: 1409.1556 [cs] (2014). Such a network may include a plurality of convolutional layers and a second plurality of pooling layers. For example, the VGG-Network provided sixteen (16) convolutional and five (5) pooling layers. Each layer of the CNN may separately encode a given input image, such as the training images 1101a-c.

Each layer of the CNN may be comprised of a series of one or more filters. Each of the filters provides a response or output when provided with an input image. These filter responses may be stored as part of the object database 1110. How a particular image is represented by a particular layer of the CNN may be identified by performing a gradient descent from a starting image, such as a white noise image, until a distance between a resulting image and the particular image is minimized.

Figure 12:
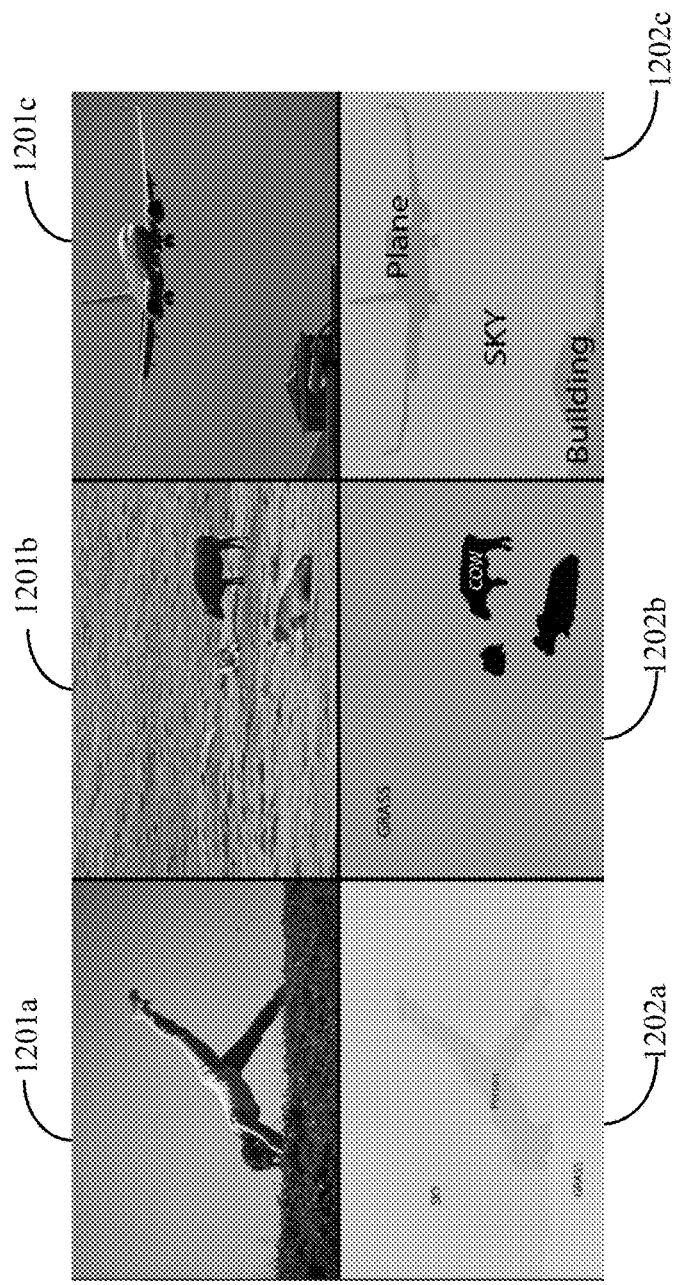
FIG. 12 shows segmentation of three example images 1201a-c.

FIG. 12 shows segmentation of three images 1201a-c. A first image 1201a includes grass and a human. The segmented image 1202a shows that a CNN has classified the human and grass. A second image 1201b shows cows in a field of grass. The image 1202b shows how a CNN is able to classify several objects in the image but only one of the objects was identified as a cow. A third image 1201c shows an airplane, while the image 1202c demonstrates a CNN's ability to classify objects in the image 1201c as either sky, building, or airplane. While FIG. 12 shows that images may be segmented into one or more objects, the disclosed methods and systems may still provide improved images even when some inaccuracies in image segmentation are present.

Figure 13:
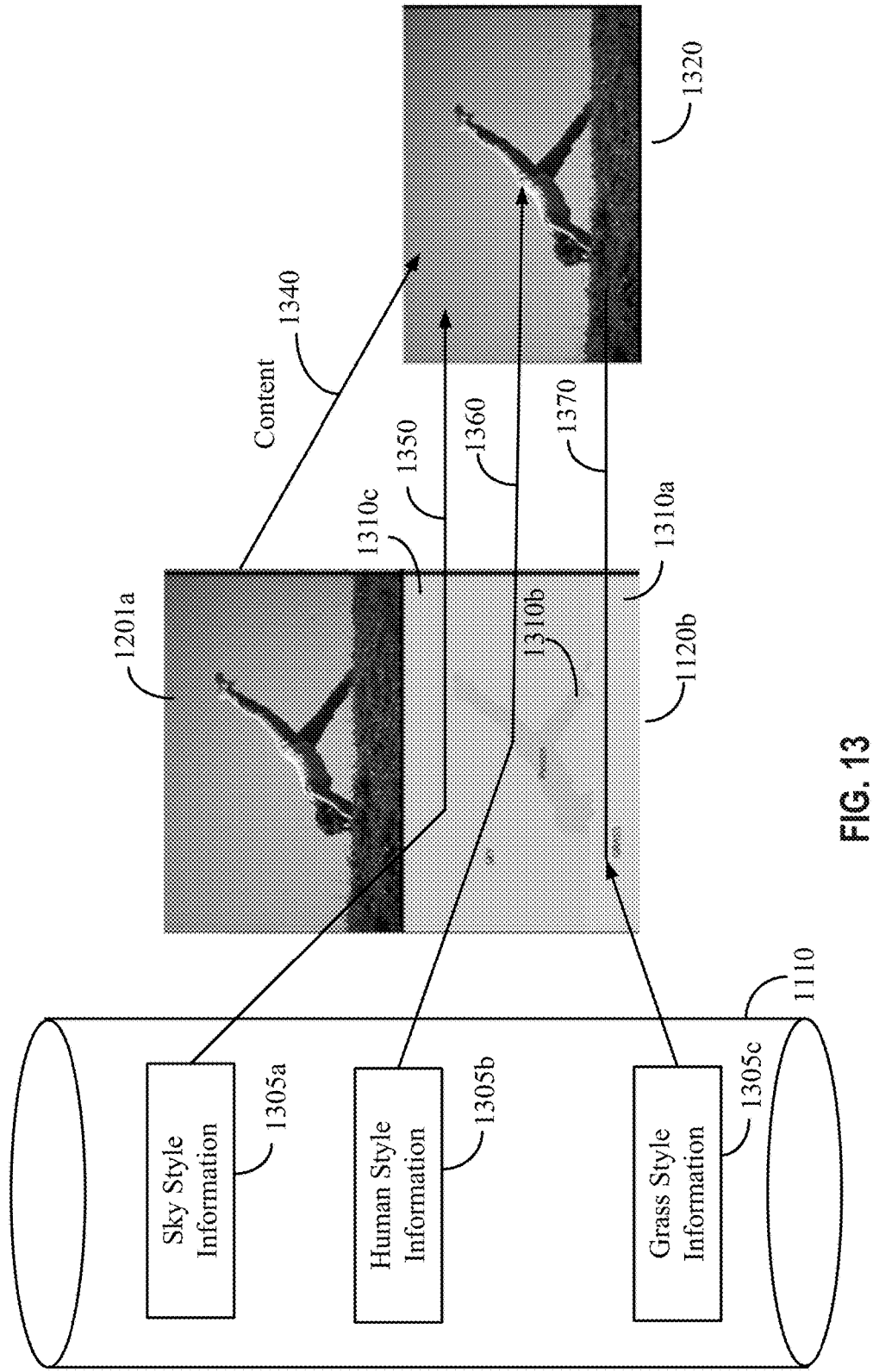
FIG. 13 is an exemplary dataflow diagram of how texture information created by a CNN may be utilized to improve image textures of objects identified in an image.

FIG. 13 is an exemplary dataflow diagram of how content representations and style representations may be utilized to generate an improved image. FIG. 13 shows an original input image 1201a. FIG. 13 shows a hypothetical application of image 1201a from FIG. 12 as image 1120a of FIG. 11 to the database application shown in FIG. 11, and in particular, to the CNN 1105b. The original input image 1201a is segmented, in some aspects by a convolutional neural network, to identify multiple objects 1310a-c, shown in image 1120b. The segmented image 1120b of FIG. 11 corresponds to the image 1202a of FIG. 12, illustrating that the CNN 1105b was able to identify sky, grass, and a body of the woman in FIG. 12's image 1201a.

Image content from the original image 1201a, as represented by filter responses within layers of the convolutional neural network, may be preserved to produce a new image 1320. Style information 1305a-c may be used to minimize differences between styles of objects 1310a-c as they appear in the new image 1320, and styles of objects included in the training image sets 110-1a-c used to generate the object database 1110.

The disclosed methods and systems may search the database 1110 for style information for one or more of the identified objects. The style information in the database 1110 which may include texture information, may then be used to update segmented regions of the image 1120b corresponding to the particular objects to produce image 1320. In some aspects the style information 1305a-c may represent output of filters generated based on the training images 1101a-c. For example, style information 1305a may include output values of filters of a CNN when those filters are applied to one or more images representing sky. Style information 1305b may include output values of filters of the CNN when those filters are applied to one or more images representing a human.

In some aspects, the style information 1305a-c may indicate one or more of a spatial frequency and average grey level of the corresponding object. In some aspects, a the style information 1305a-c may indicate one or more of a number of edge pixels within an object, as this may be a characteristic of texture complexity. The direction of edges may also be indicated by the style information 1305a-c, as this is a characteristic of object texture.

In some aspects, sky style or texture information 1305a stored in the database 1110 may be utilized to update portions 1310c of the image 1120b identified as sky by the CNN 1105b when generating image 1320. Human style or texture information 1305b may be utilized to update portions 1310b of the image 1120b identified as a human by the CNN 1105b when generating image 1320. Grass style or texture information 1305c may be utilized to update portions 1305a of the image 1120b corresponding to grass as identified by the CNN 1105b.

Figure 14:
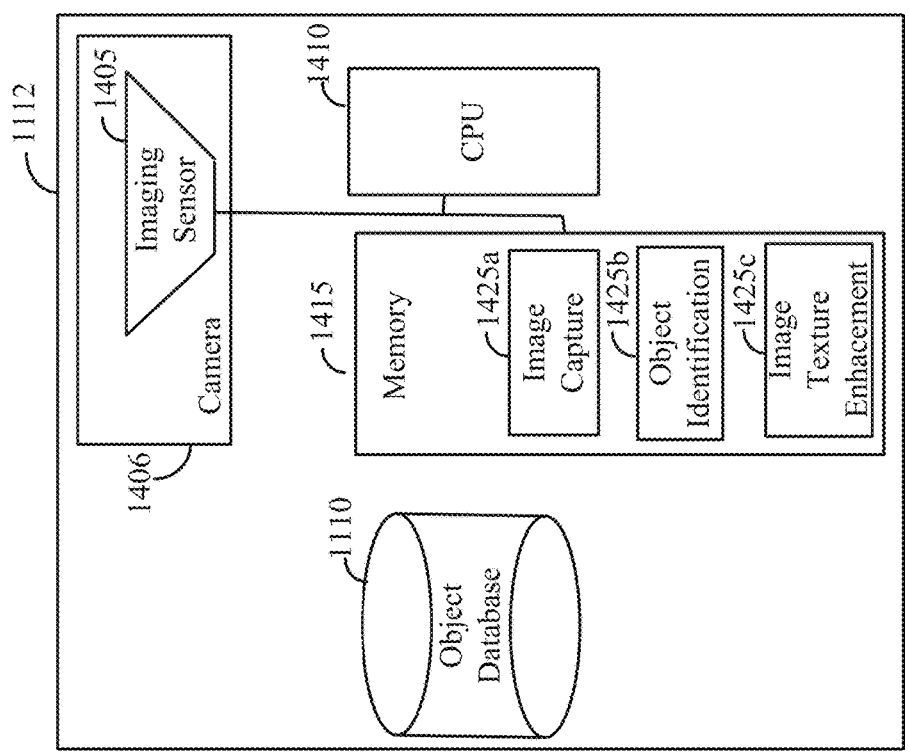
FIG. 14 is an exemplary block diagram of a device implementing one or more of the disclosed embodiments.

FIG. 14 is an exemplary block diagram of a device implementing one or more of the disclosed embodiments. The device 1112 includes an imaging sensor 1405, electronic hardware processor 1410, such as a central processing unit (CPU), an electronic hardware memory 1415, and an object database 1110. The imaging sensor may be part of a camera 1406. The camera may include a light emitting device in some embodiments, such as a flash device. The camera 1406 may also include a shutter release button in some aspects.

The processor 1410 may represent the general purpose processor 502 shown in FIG. 5, and/or the one or more processing units 606 shown in FIG. 6 in some aspects. The memory 1415 may store instructions that configure the processor 1410 to perform one or more of the functions of the systems and methods discussed herein. The instructions may be organized into modules, such as an image capture module 1425a, object identification module 1425b, and an image texture enhancement module 1425c. The image capture module 1425a may configure the processor 1410 to capture an image with the imaging sensor 1405. The object identification module 1425 may employ a CNN to identify one or more objects within the image captured by the imaging sensor 1405. In some aspects, the object identification module 1425 may include the CNN 1105b discussed above with respect to FIG. 11. The image texture enhancement module may utilize the object database 1110 to update the image captured by the imaging sensor 1405 based on texture information stored in the database 1110 for objects matching objects identified in the image by the object identification module 1425b. For example, as described below, in some aspects, the image texture enhancement module 1425c may minimize differences between style representations of objects present in the training image sets 1101a-c described above, and style representations of objects detected by the object identification module 1425b.

Figure 15:
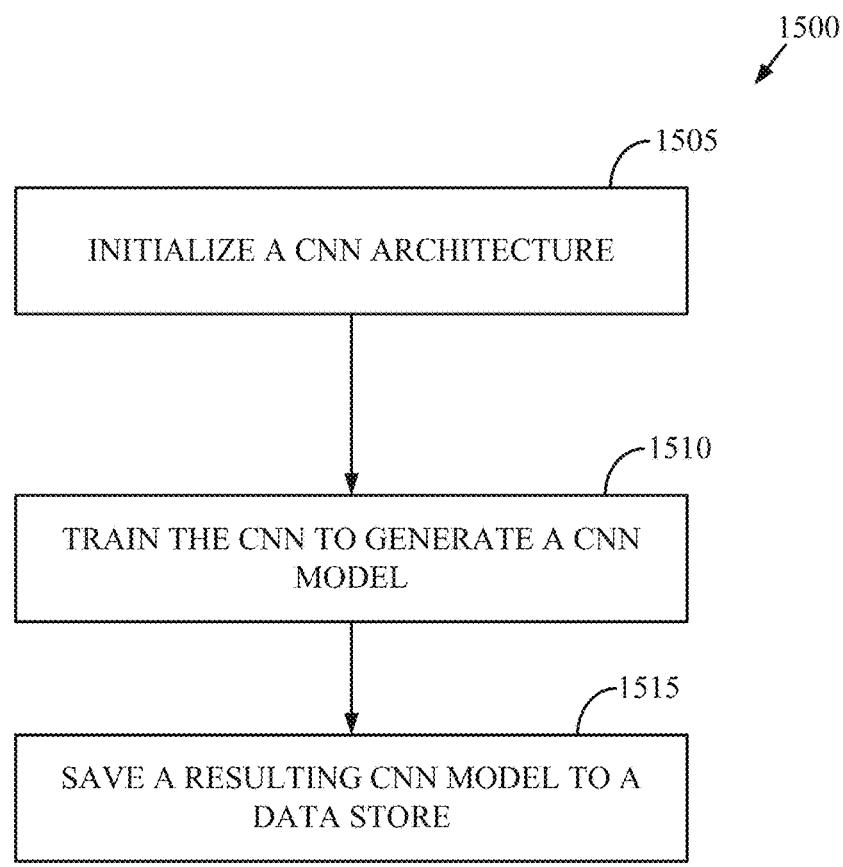
FIG. 15 is an exemplary process for initializing and training a convolutional neural network.

FIG. 15 is an exemplary process for initializing and training a convolutional neural network. In some aspects, the process 1500 may be performed by the database factory 1102, discussed above with respect to FIG. 11. For example, in some aspects, one or more electronic hardware processors in the database factory 1102 may be configured to perform one or more of the functions discussed below with respect to process 1500.

In block 1505, a convolutional neural network is initialized. In some aspects, the CNN may be initialized so as to recognize textures within images. In some aspects, the CNN may recognize textures as an arrangement of intensities in a region of the image. In some aspects, the CNN may be initialized so as to identify a number of edge pixels in regions of the image. In some aspects, a direction of the edges in the regions may also be determined and used as a characteristic of textures in the image. The direction of the edges may be represented In some aspects, block 1505 may initialize the CNN to be equivalent to the VGG-19 network, as defined by Simonyan and Zissermann in 2014. The VGG-19 includes two operations, a 3×3×k rectified convolution, and 2×2 max-pooling.

In block 1510, the convolutional neural network is trained to generate a model. In some aspects, the CNN is trained to recognize a plurality of objects. In some aspects, training the CNN may include processing a series of training images by the CNN for each object to be recognized. The training of the CNN generates a CNN model or object database. The model includes data defining unique characteristics of the plurality of objects in the series of training images. In some aspects, the unique characteristics of each of the plurality of objects may include a texture of each of the plurality of objects. In some aspects, the unique characteristics of each of the plurality of objects may be a spatial frequency of the object and/or an average grey level of the object. In some aspects, the training of the CNN generates output values from a plurality of filters in one or more layers of the CNN. Filter output values generated based on an input image, such as a training image may represent a signature of the input image. Block 1510 may associate a type of object with the signature. For example, when the CNN is trained, it may receive input indicating a type of object included in the image. The CNN may then generate filter values based on the received image, and associate the type of object with the filter output values. These associations between object type and filter output values may be part of a CNN Model generated by block 1510

In aspects that utilize the CNN to recognize trees, grass, and sky, a first set of training images may represent trees, a second set of training images may represent grass, and a third set of training images may represent sky. The training images representing trees may generate signatures that include commonalities in some filter values. These commonalities in the filter values associated with trees may enable the CNN to recognize images including trees in some aspects. In some aspects, before the training images are provided to the CNN for processing, the average of the images is removed. In some aspects, training the CNN includes identifying one or more textures associated with each of the objects to be recognized.

In block 1515, a CNN model or object database is stored based on a training images and the architecture. In some aspects, the CNN model stored in block 1515 may be the object database 1110, discussed above with respect to FIG. 11. In some aspects, the CNN model or object database stored in block 1515 includes a plurality of CNN descriptors, such as filter outputs generated by the training of block 1510. Each of the descriptors may be associated with a particular object type (e.g. grass, trees, sky) to be recognized. In some aspects, some of the CNN descriptors for an object may relate to spatial relationships and/or content defining the object itself. Other CNN descriptors for an object may relate to a style of the object, such as the texture of the object. This information may include one or more of spatial frequencies of the object, grey tones of the object, edge density and/or edge direction of the object. In some aspects, filters of the CNN may be configured to generate outputs based on one or more of spatial frequencies, grey tones, edge density or direction of objects in the image.

Figure 16:
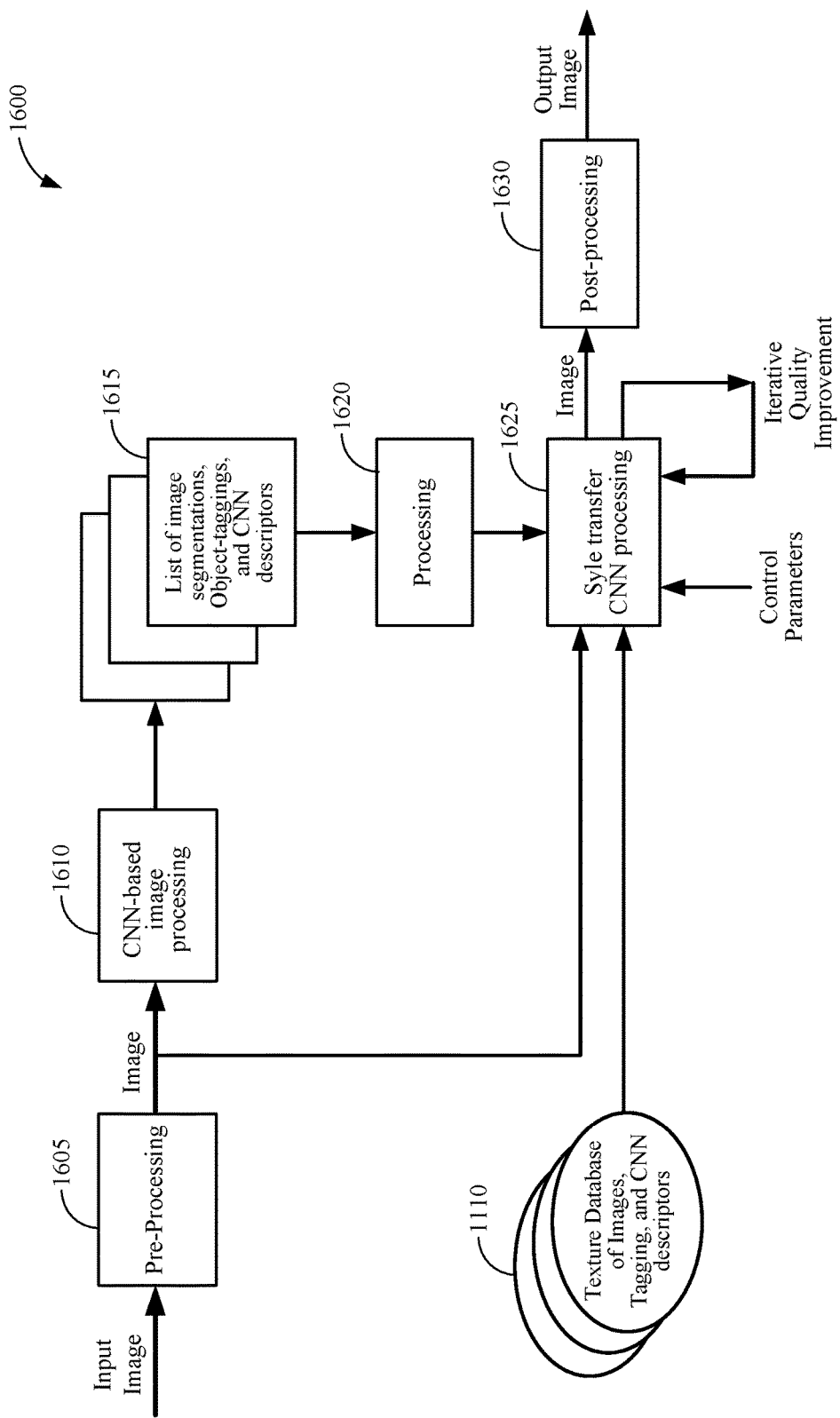
FIG. 16 is an exemplary data flow diagram of an image texture enhancement system.

FIG. 16 is an exemplary data flow diagram of an image texture enhancement system. In some aspects, the data flow of FIG. 16 may be implemented within the device 1112 of FIG. 14. For example, in some aspects, the hardware processor 1410 may be configured by instructions stored in the hardware memory 1415 to perform one or more of the functions and/or data flows discussed below with respect to FIG. 16.

In block 1605, an input image may be preprocessed. The input image may be received, in some aspects, from an imaging sensor, such as imaging sensor 1405. In some aspects, the input image may be received from a computer network or from a stable storage, such as a hard disk or solid state disk array. In some aspects, the input image may have been captured under low light conditions. In some aspects, the entire image may reflect a low level of light exposure when the image was captured. In some other aspects, only one or more portions of the image may exhibit low exposure. For example, in some aspects, the image may be captured in bright sun, but may include one or more objects that fall within a shadow. Thus, in these aspects, the camera capturing the image may adjust exposure settings based on the bright sun, but portions of the image in shadow may be under exposed. Some applications may be more likely than others to exhibit under exposure of images or portions of images. For example, in some aspects, the device 1112 may be mounted or otherwise incorporated into a vehicle and/or drone. In these aspects, because there may not be a human operator associated with the capturing of images, a higher percentage of the images may be under exposed relative to images captured by a human operator.

In some aspects, preprocessing the image may include removing the image's mean value. The image may also be smoothed by applying a Gaussian kernel with a standard deviation, in various aspects, of one (1), two (2), three (3), four (4), or five (5) pixels. Other standard deviations are contemplated. In some aspects, the standard deviation of the Gaussian kernel may be based on a size of a filter utilized by the convolutional neural network (CNN) discussed below with respect to block 1610.

In some aspects, block 1605 may include resizing of an image to a standard size. Normalizing image and/or object sizes can improve object recognition confidence. Therefore, in some aspects, objects within the input image may be sized to a normalized size.

In block 1610, the image is processed by a convolutional neural network (CNN) to identify one or more objects within the image. As discussed above, objects previously processed by the CNN, for example, via previously provided training images, may be of a particular type. Data stored in the database 1110 as part of that training process may associate an object type with corresponding CNN filter output values for objects of that type. In some aspects, the objects identified in the input image in block 1610 are recognized by the CNN to be of a particular type based on the associations between filter output values and object types stored in the database 1110. Block 1610 may segment different subsets or regions of the input image into different object types. In some aspects, particular regions of the image representing a particular object may generate filter output values characteristic of the particular object. If this object was included in the training images discussed above, the database 1110 may store an association between the filter output values characteristic of the particular object and the object type. These associations may be used by block 1610 to identify that the particular region represents the particular object.

As an example of the object identification that may occur in block 1610, any of the exemplary images 1201a-b shown in FIG. 12 may be segmented into regions associated with separate objects within the image. Example regions are shown by image segmentations 1202a-b respectively. The result of the segmentation may be a list of image segmentations, the associated tags, and CNN descriptors as shown in block 1615. For example, if segmenting mage 1201a, block 1610 may identify a region of the image 1201a representing sky, a second region representing grass, and a third region representing a person.

In some aspects, the object identification of block 1610 may be performed without the use of a convolutional neural network. For example, in some aspects, appearance based methods, such as edge matching, divide and conquer search, greyscale matching, or gradient matching may be used. Feature based methods may also be used in other aspects. These include interpretation trees, hypothesize and test methods, pose consistency, pose clustering, geometric hashing or other feature methods. In aspects not utilizing a CNN for object recognition, block 1615 may not be present as part of process 1600.

Additional processing may occur in block 1620. In some aspects, this processing may include sharpening operations on the input image and in some aspects, noise reduction may be performed.

In block 1625, two or more regions of the input image representing objects identified in block 1610 are separately updated based on individual texture information for each object. In aspects utilizing a CNN, the individual texture information may be based on any of the training image sets 1101a-c used to train the CNN, which can be later retrieved from the database 1110. In aspects that do not utilize the CNN, texture information may be obtained from data that associates object types with object textures.

In some aspects, separate individual artistic style transfer operations may be utilized to transfer object textures represented by data in the database 1110 to each of the two or more objects recognized in block 1610. For example, in some aspects, the methods disclosed in Gatys, Leon, et. al, *A Neural Algorithm of Artistic Style*, Cornell University Library, Computer Vision and Pattern Recognition, Submitted 26 Aug. 2015, last revised 2 Sep. 2015 ("Gatys"), may be utilized. Gatys is hereby incorporated by reference in its entirety.

In some aspects, block 1625 utilizes a set of content reconstruction layers of a CNN to preserve content of the input image. These content reconstruction layers may be configured to generate filter responses based on image content, as discussed in Gatys. For example the filter responses may capture objects and their arrangement in the input image. A collection of filter responses in a particular layer of the CNN may be considered a feature map.

In some aspects, block 1625 may start with a white noise image, or a random image. In some aspects, block 1625 may begin with the original input image. In some aspects, block 1625 then updates the starting image (new image) to minimize a difference between a content representation of the portion of the input image representing the particular object, and the content representation of the particular object in the new image. In other words, block 1625 seeks to preserve content of the recognized objects, and the input image as a whole. In some aspects, a gradient descent on the starting image may be performed to find another image that matches feature responses of the input image. In aspects starting with the original input image in block 1625, few if any operations may be necessary to minimize the content difference between the starting image and a new image. In some aspects, measurement of content representations differences ensures that the content of the starting image does not depart substantially from the original input image. In some aspects, a content representation of an image may be based on layers 'conv1_1, conv2_1, conv3_1, conv4_1, and conv5_1 of the original VGG-Network. For example, Gatys found that by utilizing only layers conv4_1 and conv5_1, detailed pixel information is lost while high-level content of the image is preserved. Thus, in some aspects, the content representation may be based only on layers conv4_1 and conv5_1. In some aspects, the content representation may be matched across layer 'conv4_2' only.

While the content of the input image is preserved, some aspects of block 1625 modify the starting image to minimize a difference in style information between objects identified in the input image and style information for objects of the same type. In aspects utilizing a CNN, the objects of the same type may be recognized by the CNN from training images previously provided to the CNN.

One or more layers of a CNN may represent textures or styles of objects provided to the CNN, be it either training images or the input image. As described by Gatys, in one aspect, a style representation may be based on correlations between different filter responses of the CNN. As described by Gatys, a feature space consisting of correlations between different filter responses over a spatial extent of the feature maps may be utilized to generate a style representation. By including feature correlations of multiple layers of the CNN, stationary, multi-scale representations of the input image are obtained. These representations include texture information but may not include the global arrangement (content) of the image. A Gram matrix including an inner product between vectorized feature maps in a layer of the CNN may provide the feature correlations in some aspects. In some aspects, the style representations may be based on one or more of VGG layers conv1_1, conv2_1, conv3_1, conv4_1, and conv5_1. In some aspects, the style representations may be based on only VGG layer conv1_1, or VGG layers conv1_1 and conv2_1, or VGG layers conv1_1, conv2_1, and conv3_1, or VGG layers conv1_1, conv2_1, cov3_1, and conv4_1, or VGG layers conv1_1, conv2_1, conv3_1, conv4_1, and conv5_1.

Styles of the recognized objects in the starting (new) image may be modified by applying Gatys style reconstructions to two or more recognized objects, while preserving the image content via content reconstructions layers of the CNN. Whereas Gatys applies a single style of a whole image to an entire single new image, the disclosed implementation of artistic style transfer may be performed separately for multiple objects of different types in the single new image, based on styles from multiple other images.

Thus, we enhance the process of Gatys here to minimize multiple different differences in separate style representations within the single new image. For example, a first difference in style representations is minimized in block 1625. The first difference is between a first recognized object of a first type (as represented in the new image) and one or more style representations of one or more objects of the first type stored in the object database 1110. A second difference in a second style representation is also minimized. This second difference is between a second recognized object of a second type (as represented by the new image) and one or more second style representations of objects of the second type stored in the object database 1110. This process is not limited to two objects with two different types, but may be extended to any number of objects recognized in the input image having any number of different types.

In some aspects, as described by Gatys, differences in style representations of whole images may be a mean squared distance between entries of a Gram matrix derived from the original input image and a Gram matrix derived the new image. As also described by Gatys, the Gram matrix may be comprised of an inner product between vectorized feature maps within a layer of the CNN. As discussed above, the disclosed methods and systems minimize multiple differences between styles of recognized objects and styles of objects of the same type from the database 1110.

In block 1630, additional post processing may be performed. For example, if resizing was performed on certain objects in block 1605, the resizing may correct, in that the one or more resized objects may be rescaled to their original dimensions. In block 1630, multiple objects may be integrated after the artistic style transfer discussed above. In some aspects, grain may be added to the image to reduce artifacts associated with the artistic style transfers of different textures to different parts of the image appear less noticeable.

Figure 17:
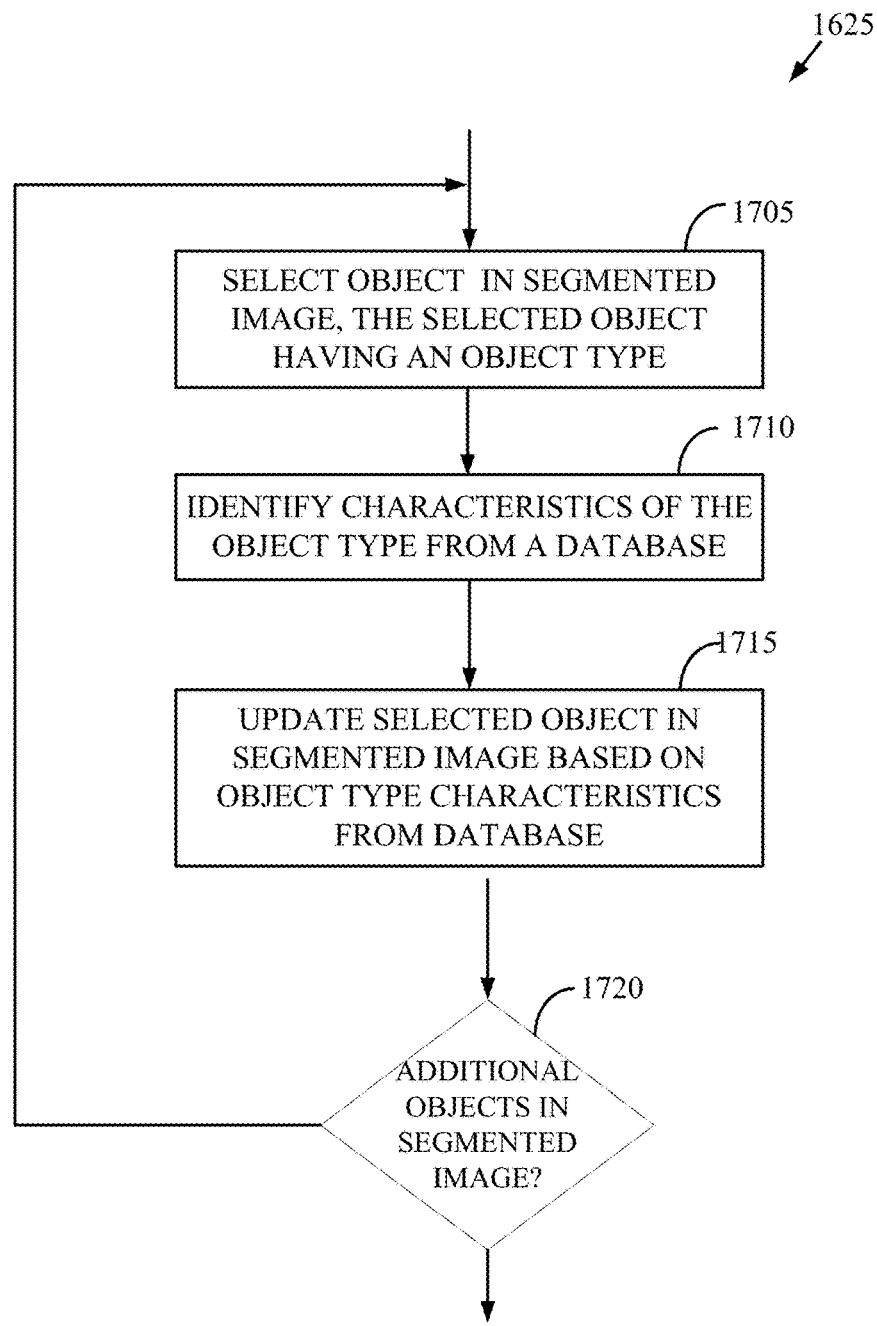
FIG. 17 is an exemplary implementation of block 1625 of FIG. 16.

FIG. 17 is an exemplary implementation of block 1625 of FIG. 16. In some aspects, process 1625 of FIG. 17 may be performed by the processor or CPU 1410 discussed above with respect to FIG. 14. For example, instructions in the image texture enhancement module 1425*c* may configure the processor 1410 to perform one or more of the functions discussed below with respect to FIG. 17.

In block 1705, an object is selected from a segmented image. For example, in some aspects, the segmented image may be similar to one or more of the images 1202*a-c* discussed above with respect to FIG. 12. The segmented image may be segmented into two or more objects of different types, such as the grass, cows, airplane, human, sky, building, or any other recognized object. The selected object has an object type.

In block 1710, characteristics of the selected object's type are identified from a database. For example, as discussed above, in some aspects, the database may be based on a library of training image data. In some aspects, the database may be database 1110 discussed above. The database may relate object types to object textures in some aspects. For example, the database may store first texture information for grass, and second texture information for sky. In some aspects, the database may relate object types to filter responses of a convolutional neural network. In these aspects, the characteristics may be the filter responses.

In block 1715, the selected object in the segmented image is updated based on the object type characteristics. For example, in some aspects, texture for the selected object may be updated based on textures associated with objects of the selected type.

As discussed above with respect to FIG. 16, in some aspects, block 1715 may utilize artistic style transfer to preserve the content of the selected object in the segmented image. While preserving content, artistic style transfer style, such as texture and/or other characteristics of database objects of the same type as that of the selected object. The database objects may have been identified from training images, such as those in one or more of training sets 1101*a-c* and are thus present in a database, such as database 1110.

Block 1715 may include the "iterative quality improvement" shown in FIG. 16, in that some artistic style transfer algorithms may perform multiple iterations when transferring style to the selected object.

As an example, in some aspects, block 1715 may preserve an image content portion of a region representing "grass" as the selected object, while transferring grass style information, such as texture associated with grass, to a region of the image representing the selected object. The grass texture may be obtained from a database developed during training of a CNN, as discussed above for example, with respect to FIGS. 11-13.

In block 1720, if there are additional objects in the segmented image, processing returns to block 1705, where another object is selected. Otherwise, processing continues. For example, the updated image may be saved to a stable storage.

In some aspects of process 1600, low and high exposure portions of the input image may be determined. For example, portions of the image having a luminance above a threshold may be determined to be high exposure portions, while other portions of the image having a luminance below a second threshold may be considered low exposure portions. In some aspects, the portions may be equivalent to objects detected by the CNN in block 1610. For example, in some aspects, the luminance of individual objects detected in block In some aspects, the updating of the image data as described above with respect to block 1625 may only be performed on the low exposure portions of the input image. Because the high exposure portions may have obtained adequate texture information when the input image is captured, there may not be a need to update the higher exposure portions in some aspects.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the FIG.s may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

As used herein, the term "plurality" denotes two or more. For example, a plurality of components indicates two or more components. The terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. The term "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of generating images, the method performed by a processor of a system and comprising:
   capturing an image using an imaging sensor;
   receiving image data from the imaging sensor;
   identifying a first and second object represented by the image data;
   identifying a first and second type of the first and second objects, respectively;
   identifying first style information for the first type of object and different second style information for the second type of object from an object database;
   generating second image data representing the first and second objects based on the image data and the first and second style information; and
   providing the second image data to an output device.

2. The method of claim 1, further comprising identifying the first and second object via a convolutional neural network.

3. The method of claim 2, further comprising utilizing artistic style transfer to transfer different styles to the first and second objects in the second image data based on the first and second style information, respectively.

4. The method of claim 3, wherein utilizing the artistic style transfer comprises at least one of minimizing a distance between the convolutional neural network's content representation of the image data representing the first object and the convolutional neural network's content representation of the second image data representing the first object or minimizing a second distance between style representations of the first object in the second image data and the first style information.

5. The method of claim 3, wherein utilizing the artistic style transfer further comprises at least one of minimizing a third distance between the convolutional neural network's content representation of the image data representing the second object and the convolutional neural network's content representation of the second image data representing the second object or minimizing a fourth distance between style representations of the second object in the second image and the second style information.

6. The method of claim 5, wherein the content representations are based on feature representations for a plurality of layers in the convolutional neural network of the first and second objects represented by the image data and of the first object in the second image data.

7. The method of claim 6, wherein the feature representations are based on filtered image data.

8. The method of claim 5, wherein the style representations are based on correlations between different filter responses of the convolutional neural network to the first object in the second image data and correlations between different filter responses stored in the object database for objects of the first type.

9. The method of claim 1, further comprising:
identifying low exposure and high exposure portions of the image data; and
generating the second image based on the first or second style information for low exposure portions of the image data.

10. An apparatus for generating an image comprising:
a camera including an imaging sensor configured to capture one or more images; and
a processor configured to:
receive image data from the one or more images captured by the imaging sensor;
identify a first and second object represented by the image data;
identify a first and second type of the first and second objects, respectively;
identify first style information for the first type of object and different second style information for the second type of object from an object database;
generate second image data representing the first and second objects based on the image data and the first and second style information; and
provide the second image data to an output device.

11. The apparatus of claim 10, wherein the processor is further configured to utilize artistic style transfer to transfer different styles to the first and second objects in the second image data based on the first and second style information respectively.

12. The apparatus of claim 11, wherein utilizing the artistic style transfer comprises at least one of minimizing a distance between a convolutional neural network's content representation of the image data representing the first object and the convolutional neural network's content representation of the second image data representing the first object or minimizing a second distance between style representations of the first object in the second image data and the first style information.

13. The apparatus of claim 12, wherein utilizing the artistic style transfer further comprises at least one of minimizing a third distance between the convolutional neural network's content representation of the image data representing the second object and the convolutional neural network's content representation of the second image data representing the second object or minimizing a fourth distance between style representations of the second object in the second image and the second style information.

14. The apparatus of claim 13, wherein the content representations are based on feature representations for a plurality of layers in the convolutional neural network of the first and second objects represented by the image data and of the first object in the second image data.

15. The apparatus of claim 14, wherein the feature representations are based on filtered image data.

16. The apparatus of claim 13, wherein the style representations are based on correlations between different filter responses of the convolutional neural network to the first object in the second image data and correlations between different filter responses stored in the object database for objects of the first type.

17. The apparatus of claim 10, wherein the first and second objects are identified via a convolutional neural network.

18. The apparatus of claim 10, wherein the processor is further configured to:
identify low exposure and high exposure portions of the image data; and
generate the second image based on the first or second style information for low exposure portions of the image data.

19. A non-transitory computer readable medium storing instructions that, when executed by a processor of an apparatus, cause the apparatus to perform a number of operations comprising:
capturing an image using an imaging sensor;
receiving image data from the imaging sensor;
identifying a first and second object represented by the image data;
identifying a first and second type of the first and second objects, respectively;
identifying first style information for the first type of object and different second style information for the second type of object from an object database;
generating second image data representing the first and second objects based on the image data and the first and second style information; and
providing the second image data to an output device.

* * * * *